US012331764B2

(12) United States Patent
Schleis et al.

(10) Patent No.: US 12,331,764 B2
(45) Date of Patent: Jun. 17, 2025

(54) HYDRAULIC JACK ASSEMBLY AND PIN PULLER ASSEMBLY

(71) Applicant: Enerpac Tool Group Corp., Milwaukee, WI (US)

(72) Inventors: Matthiew John Schleis, West Allis, WI (US); Kyle Michael Harvey, Waukesha, WI (US); Samantha Ann Teumer, Jackson, WI (US); Ben Gall, Menomonee Falls, WI (US); Connor Joseph Sannito, Sturgeon Bay, WI (US); Edward Haase, South Milwaukee, WI (US)

(73) Assignee: Enerpac Tool Group Corp., Milwaukee, WI (US)

( * ) Notice: Subject to any disclaimer, the term of this patent is extended or adjusted under 35 U.S.C. 154(b) by 182 days.

(21) Appl. No.: 18/140,876

(22) Filed: Apr. 28, 2023

(65) Prior Publication Data

US 2023/0366416 A1 Nov. 16, 2023

Related U.S. Application Data

(60) Provisional application No. 63/337,461, filed on May 2, 2022.

(51) Int. Cl.
*F15B 15/18* (2006.01)
*B25B 27/02* (2006.01)
(Continued)

(52) U.S. Cl.
CPC ............ *F15B 15/18* (2013.01); *B25B 27/026* (2013.01); *B66F 3/26* (2013.01); *B66F 3/42* (2013.01)

(58) Field of Classification Search
CPC ................................ F15B 15/18; B25B 27/026
See application file for complete search history.

(56) References Cited

U.S. PATENT DOCUMENTS

| | | |
|---|---|---|
| 1,969,408 A | 8/1934 | Kramer et al. |
| 5,524,868 A | 6/1996 | Decker et al. |

(Continued)

FOREIGN PATENT DOCUMENTS

| | | | |
|---|---|---|---|
| CN | 108687711 A | 10/2018 | |
| DE | 202017107244 U1 * | 2/2018 | ........... B62B 3/0618 |
| WO | 2023018993 | 2/2023 | |

OTHER PUBLICATIONS

English translation DE202017107244 (Year: 2017).*

(Continued)

*Primary Examiner* — Jason L Vaughan
*Assistant Examiner* — Amanda Kreiling
(74) *Attorney, Agent, or Firm* — Andrus Intellectual Property Law, LLP

(57) ABSTRACT

A cylinder assembly having a housing, a pump supported within the housing, a motor supported within the housing and operable to power the pump, and a power source supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor.

21 Claims, 34 Drawing Sheets

(51) Int. Cl.
*B66F 3/26* (2006.01)
*B66F 3/42* (2006.01)

(56) References Cited

U.S. PATENT DOCUMENTS

| | | | |
|---|---|---|---|
| 2017/0356438 | A1 | 12/2017 | Hughes |
| 2020/0173430 | A1 | 6/2020 | Hughes et al. |

OTHER PUBLICATIONS

EP23171041.9, Partial EP Search Report dated Dec. 19, 2023, 16 pages.
Unpublished U.S. Appl. No. 63/232,519 by Kyle Harvey filed Aug. 12, 2021.
Unpublished U.S. Appl. No. 63/284,465 by Kyle Harvey filed Nov. 30, 2021.
Unpublished U.S. Appl. No. 63/336,034 by Kyle Harvey filed Apr. 28, 2022.
Unpublished U.S. Appl. No. 63/284,307 by Matthiew John Schleis filed Nov. 30, 2021.
Unpublished International Patent Application No. PCT/US2022/051434 by Matthiew John Schleis filed Nov. 30, 2022.
"HPR Range" accessed from https://www.hi-force.com/en-uk/product-details/106/hpr-range on Apr. 28, 2023.
Extended European Search Report for EP Patent Application No. 24205907.9, dated Mar. 24, 2025.

* cited by examiner

HYDRAULIC JACK ASSEMBLY AND PIN PULLER ASSEMBLY

CROSS REFERENCE TO RELATED APPLICATION

This application claims the benefit of U.S. Provisional Patent Application No. 63/337,461, filed May 2, 2022 which is incorporated herein by reference in its entirety.

FIELD

The present disclosure relates to piston-cylinder units and, more particularly, to cylinder assemblies configured for use as hydraulic jack assemblies and pin puller assemblies.

BACKGROUND

The following are incorporated herein by reference in entirety.

International Application Publication No. WO2023018993A1 discloses a cylinder assembly, a system, and methods of operating a cylinder assembly and lifting a load. The assembly may generally include a housing; a hydraulic pump supported within the housing; a motor supported within the housing and operable to power the pump; a power source supported by the housing and operable to supply power to the motor; a cylinder coupled to the housing; a piston movably supported by the cylinder, the pump being operable to supply hydraulic fluid to the cylinder to move the piston to an advanced position; and a support member engageable with a work surface to support the assembly relative to the work surface, the support member being coupled to the cylinder. The assembly may have a maximum rated force capacity of at least 15 tons (t). The cylinder assembly may be supportable by an operator for movement of the cylinder assembly relative to the work surface.

International Application No. PCT/US2022/051434 discloses a pin puller assembly, a column assembly, and methods of assembling and operating a pin puller assembly. The pin puller assembly may be operable to pull a pin from a machine having a frame supporting the pin. The pin puller assembly may generally include a piston-cylinder unit, a pull rod positionable through a piston passage, the second rod end being connectable to the pin to be pulled, a reaction member engageable between the rod and the piston; and a column assembly positionable between the cylinder and the frame, the column assembly including a first column member connectable to the cylinder and having a first length along the axis, and a second column member releasably lockable to the first column member and having a second length along the axis. The reaction member may include a split reaction member assembly.

U.S. Pat. No. 5,524,868 discloses a hydraulic toe jack including a base adapted to be supported by the ground, an elongated piston extending from the base and defining an axis, a generally cylindrical toe housing having a closed end and an open end, the toe housing defining an inner surface surrounding a portion of the piston, the toe housing being movable along the axis relative to the piston, inter-engaging components on the inner surface and the piston for preventing rotation of the toe housing relative to the piston about the axis, and a seal sealingly fixed to the toe housing adjacent the open end of the toe housing and slidably sealingly engaged with the piston.

U.S. Patent Application Publication No. 2020/0173430 discloses a self-contained pump system for supplying pressurized fluid to a remote actuator includes a handle portion adapted to be grasped by a user. The pump system also includes a brushless DC motor and a battery that has a nominal voltage of at least 60 V. The battery is operable to supply power to the motor. A 3-stage pump assembly is driven by the motor and operable to discharge hydraulic fluid that has a pressure and a flow rate.

U.S. Patent Application Publication No. 2017/0356438 discloses a fluid pump system including a housing, a motor, a fan, and a fluid conduit. The housing includes a wall having a first end and a second end, and the housing defining a first axis extending between the first end and the second end. The wall extends at least partially around the first axis and at least partially encloses a chamber. The motor is at least partially positioned within the chamber. The fan is positioned proximate the first end, and the fan generates air flow through the chamber. The fluid conduit is configured to be in fluid communication with a fluid reservoir, and at least a portion of the fluid conduit is positioned within the chamber.

The following are also incorporated by reference in their entireties: U.S. Patent Application No. 63/232,519, filed Aug. 12, 2021; U.S. Patent Application No. 63/284,465, filed Nov. 30, 2021; U.S. Patent Application No. 63/336,034, filed Apr. 28, 2022; and U.S. Patent Application No. 63/284,307, filed Nov. 30, 2021.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

Certain aspects of the present disclosure generally relate to a cylinder assembly having a housing, a pump supported within the housing, a motor supported within the housing and operable to power the pump, and a power source supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor.

In certain aspects, the cylinder assembly further includes a valve block defining a passage selectively in fluid communication between the pump and the cylinder, where the valve block is mounted on the frame and the pump is mounted to the valve block. In further aspects, a reservoir is configured to contain hydraulic fluid and in fluid communication with the pump, the reservoir being mounted on the valve block. In further examples, the reservoir extends at least partially around the pump.

In certain aspects, the frame includes a first frame member connected to the cylinder proximate the first end thereof and a second frame member spaced from the first frame member and connected to the cylinder proximate the second end thereof. In further aspects, the frame further includes a handle extending between the first frame member and the second frame member. In further aspects, the handle is a first handle and the frame includes a second handle spaced from the first handle connected and extending between the first frame member and the second frame member. In further aspects, a first rigging point is connected to the first frame member and a second rigging point connected to the second frame member.

In certain aspects, the cylinder assembly further includes a pressure gauge configured to measure a pressure of the hydraulic fluid.

In certain aspects, the power source includes a rechargeable battery pack to supply the power to the motor as DC power.

Other aspects of the present disclosure generally relate to a pin puller assembly configured for pulling a pin from a machine, the pin puller assembly comprising a cylinder assembly such as those disclosed herein, wherein a passage extends through the cylinder. By way of example, the cylinder assembly may have a housing, a pump supported within the housing, a motor supported within the housing and operable to power the pump, and a power source supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor. In certain aspects, the pin puller assembly further includes a pull rod positionable through the passage extending through the cylinder, the pull rod having a first end positioned proximate the first end of the cylinder and a second end positioned proximate the second end of the cylinder, the second end of the pull rod being configured to be connectable to the pin to be pulled. A reaction member is engageable between the pull rod and the piston.

In certain aspects, a column is configured to be coupled proximate the first end of the cylinder such that the column is positioned between the cylinder and the machine when pulling the pin therefrom. In further aspects, the column is a first column and is configured such that a second column is coupleable to the first column such that the second column in positioned between the first column and the machine when pulling the pin therefrom. In further aspects, a rigging point is coupled to the column, the rigging point being configured for supporting at least a portion of the pin puller assembly. In further aspects, the rigging point is a first rigging point, further comprising another rigging point coupled to the frame, the another rigging point being configured for supporting another portion of the pin puller assembly with the first rigging point.

Other aspects of the present disclosure generally relate to a hydraulic jack assembly configured for lifting an external load, where the hydraulic jack assembly includes a cylinder assembly such as those disclosed herein. By way of example, the cylinder assembly may have a housing, a pump supported within the housing, a motor supported within the housing and operable to power the pump, and a power source supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor. In certain aspects, the hydraulic jack assembly further includes a base plate positioned proximate the piston, wherein the base plate is configured to be positioned to support the external load such that moving the piston relative to the cylinder lifts the external load.

In certain aspects, the frame has a first end proximate the first end of the cylinder and an opposite second end proximate the second end of the cylinder, and the first end of the frame is configured to be positioned on a support surface such that operating the cylinder assembly lifts the external load vertically away from the support surface.

In certain aspects, the base plate comprises a toe jack.

Other aspects of the present disclosure generally relate to a cylinder assembly configured for use as a pin puller assembly for pulling a pin from a machine by coupling a column to the cylinder assembly, and for use as a hydraulic jack for lifting an external load without the column coupled to the cylinder assembly. The cylinder assembly includes a housing, a pump supported within the housing, and a motor supported within the housing and operable to power the pump. A power source is supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor, where the cylinder extends between a first end and an opposite second end in a first direction and between a third end and an opposite fourth end in a second direction that is perpendicular to the first direction. The cylinder assembly is configured such that the column is coupleable thereto proximate the third end of the frame such that the column is positioned between the cylinder and the machine when pulling the pin therefrom, and where the frame is configured such that the third end thereof is positionable on a support surface when lifting the external load.

In certain aspects, a rigging point is coupled to the frame proximate the first end thereof, where the rigging point is configured such that the cylinder assembly is suspendable therefrom when operated as the pin puller assembly.

In certain aspects, the cylinder assembly further includes an attachment plate configured for coupling the column to the cylinder via twist-lock, and wherein the attachment plate is also configured for coupling a base plate to the cylinder via twist-lock for use as the hydraulic jack.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following drawings.

DETAILED DESCRIPTION

Figure 1:
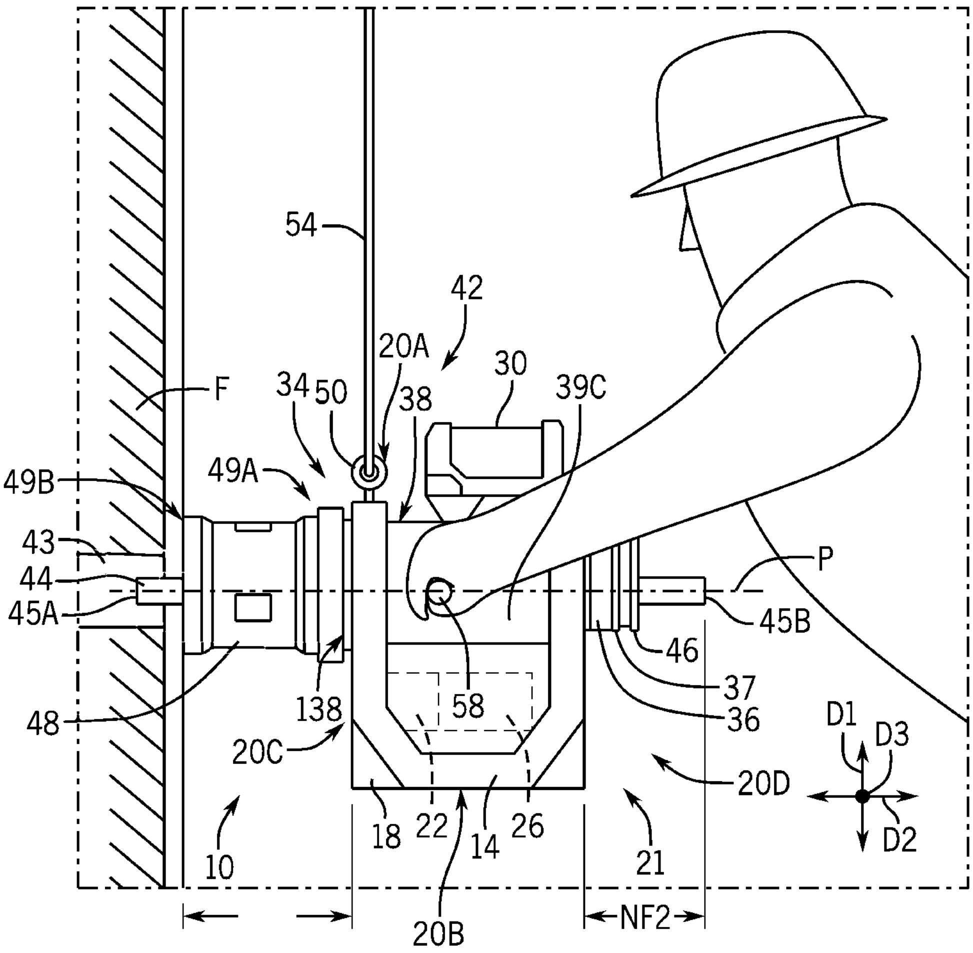
FIG. 1 is a side view of a self-contained cylinder assembly configured for operation as a pin puller assembly according to the present disclosure.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

In general, heavy equipment such as is found on construction sites, farms, and other locations contains articulation points. At an articulation point, articulation is made possible by means of a pin that fits into a recess. Pins can be heavy and can rust. For these and other reasons, pins can be difficult to remove from recesses. New and improved mechanisms and/or methods of removing pins from recesses may be needed.

A piston-cylinder unit, such as a hydraulic piston-cylinder unit, a pneumatic piston-cylinder unit, etc., uses pressurized fluid to apply large forces, for example, to remove a pin. In particular, application of the pressurized fluid to a piston advances (or may retract) the piston relative to a cylinder. A hydraulic piston-cylinder unit is usually driven by a separate motor-driven pump supplying hydraulic fluid through a hose connected to the unit. The user is required to transport the pump, hoses, etc., along with the piston-cylinder unit, to/from and around a work site. Additionally, access to electrical power or hydraulics is required to drive the pump and, thereby, the separate piston-cylinder unit.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Figure 2:
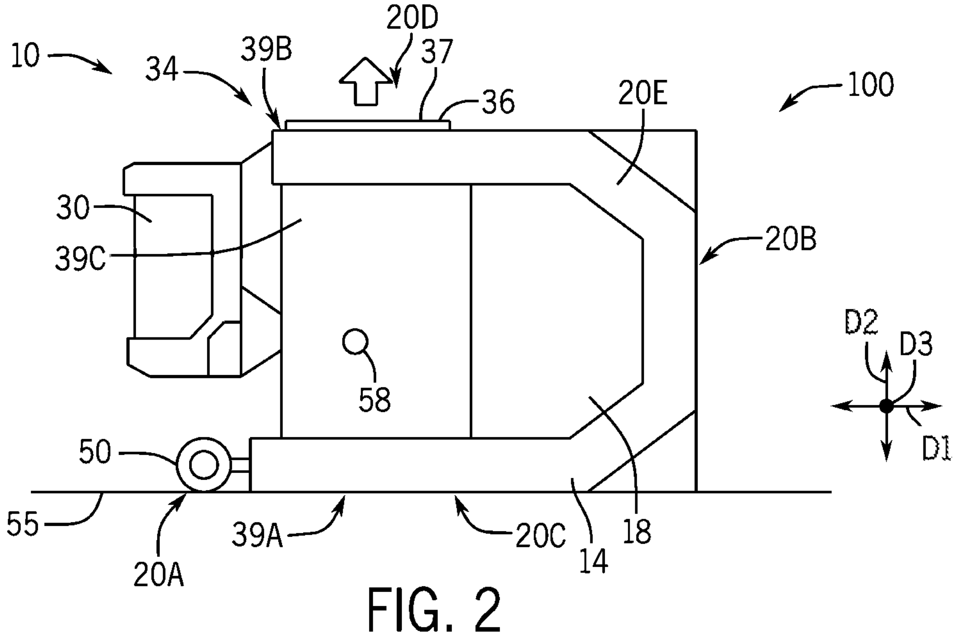
FIG. 2 is a side view of the cylinder assembly shown in FIG. 1 configured for operation as a hydraulic jack assembly according to the present disclosure.

The figures illustrate constructions of a cylinder assembly 10 which is self-contained and powered by an integrated, onboard power unit. With reference to FIGS. 1 and 2, in some examples the cylinder assembly 10 generally includes a frame 14 having one or more members, a housing 18, an onboard power unit 21 with a pump 22, a motor 26, and a power source (e.g., a battery pack 30), and a piston-cylinder unit 34 including a piston 36 movably supported by a cylinder 38. The certain examples, the pump 22 and the motor 26 are supported within the housing 18. In certain examples, the power source is supported by the housing 18 and is operable to supply power to the motor 26. In certain examples, the onboard power unit may not include one or more of the pump 22, the motor 26, and/or the power source. Additional details regarding the onboard power unit are provided below.

The cylinder 38 extends between a first end 39A and a second end 39B with a sidewall 39C therebetween. The piston 36 is moveably supported by the cylinder 38 and is moveable within the cylinder 38 in a conventional manner via operation of the onboard power unit. In particular, the pump 22 is operable to supply hydraulic fluid to the cylinder 38 to move the piston 36 at least from a retracted position to an advanced position relative to the cylinder 38. This supply of hydraulic fluid therefore provided to the piston 36 therefore varies how far the piston 36 extends from the second end 39B of the cylinder 38. In certain examples, the piston-cylinder unit 34 at least partially comprises a lightweight material such as aluminum to reduce the overall weight of the cylinder assembly 10. The piston-cylinder unit 34 may be of a type presently known in the art, such as model RCH606 piston-cylinder unit manufactured by Enerpac Tool Group Corp. of Menomonee Falls, WI.

The frame 14 includes one or more members made of a durable material for protecting the housing 18 and other content therein and thereon, which are discussed further below. The frame 14 may also provide a stable mechanism for supporting the cylinder assembly 10 on a support surface such as the ground. Additionally, the frame 14 may be configured for the user to grasp the cylinder assembly 10 during use and/or to position the cylinder assembly 10.

Figure 17:
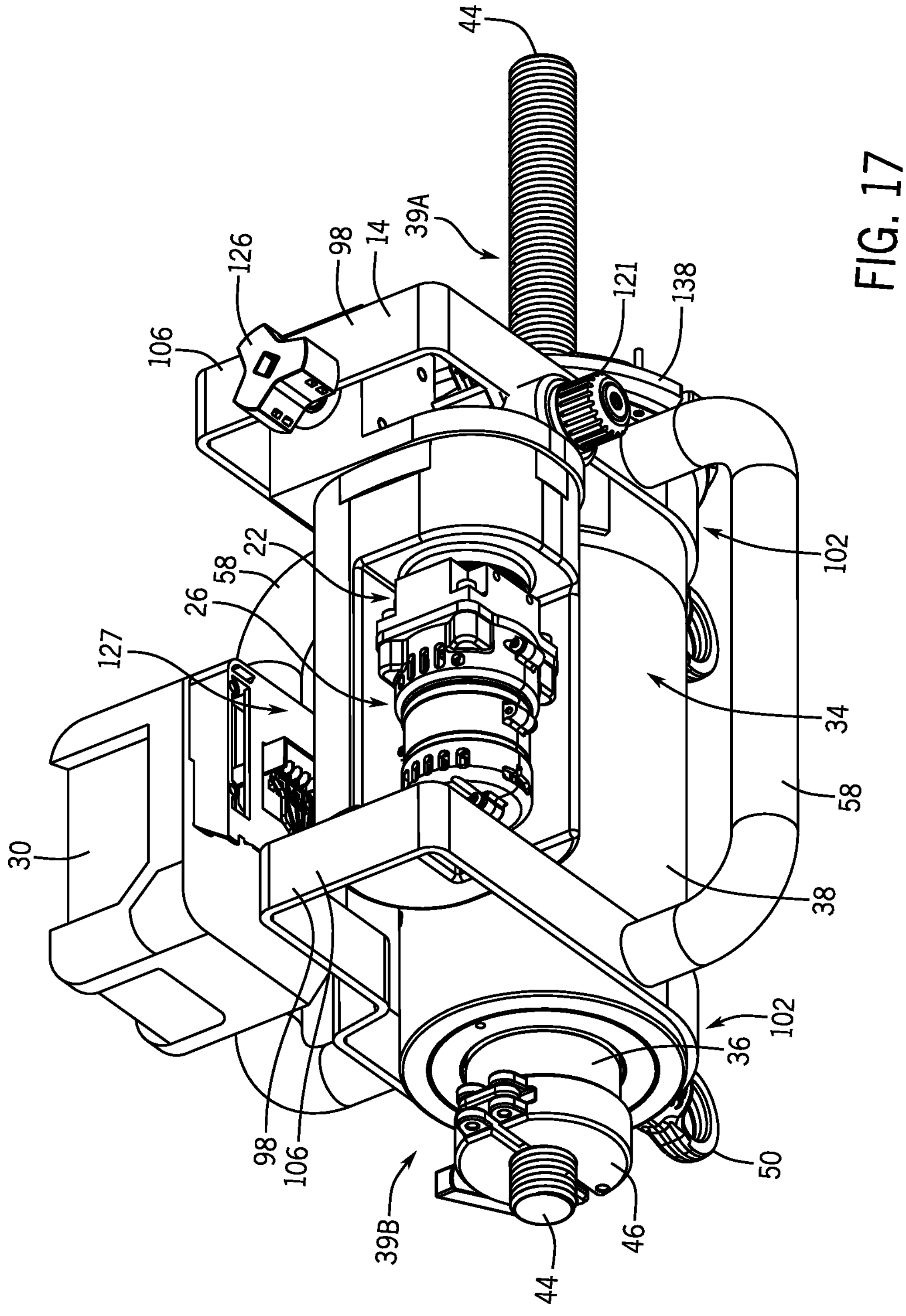
FIG. 17 is bottom perspective view of a pin puller assembly such as that shown in FIG. 9, illustrated with the housing of the cylinder assembly removed.
Figure 18:
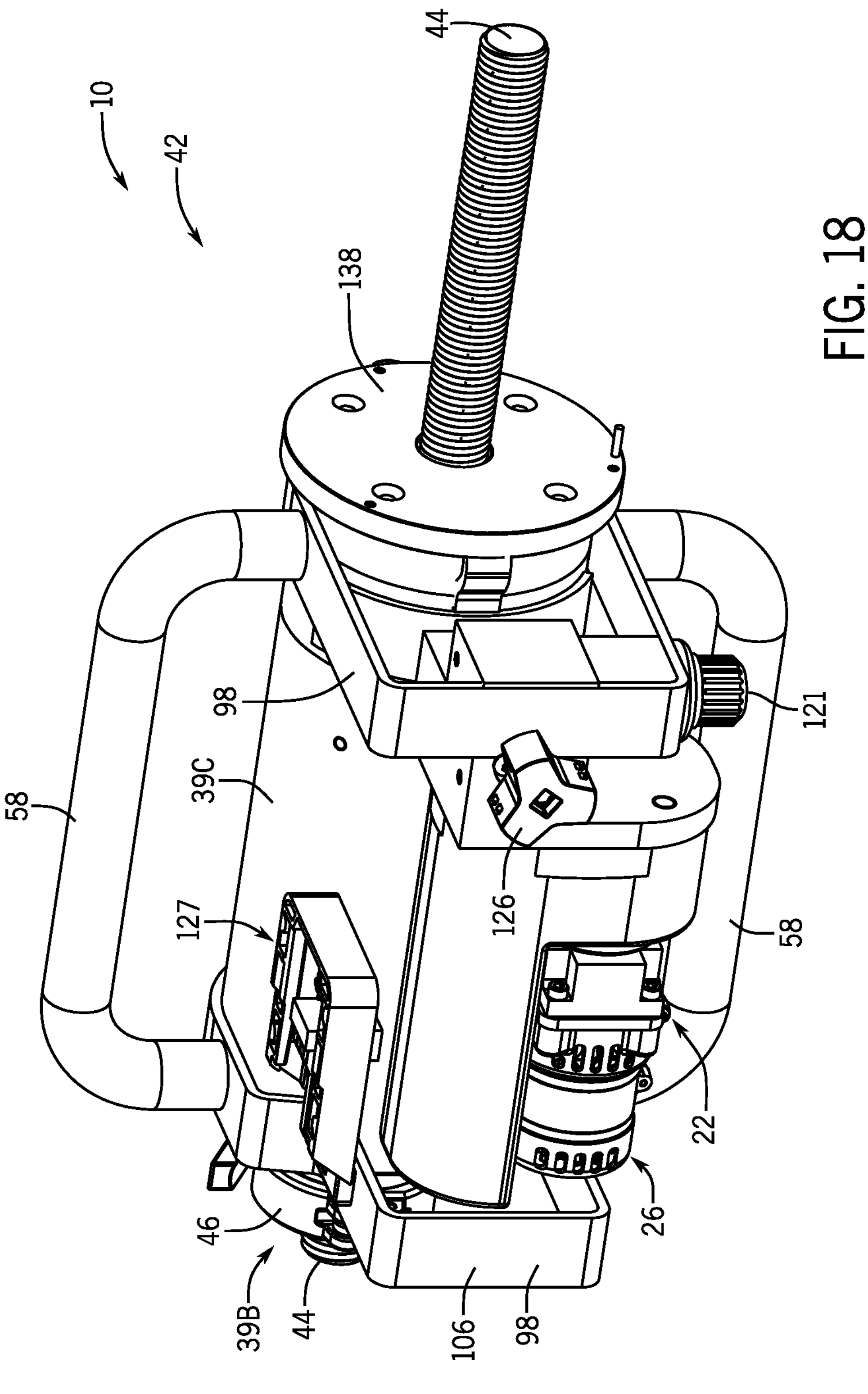
FIG. 18 is another bottom perspective view of the pin puller assembly of FIG. 17.

In certain examples, the frame 14 is formed by tubular metal pipes and/or bar stock. In the example of FIG. 17, the frame 14 includes two or more frame members 98 that are spaced apart and each coupled to the cylinder 38. In this example, a first frame member of the frame members 98 is connected to the cylinder 38 proximate the first end 39A of the cylinder 38 and a second frame member of the frame members 98 is connected to the cylinder 38 proximate the second end 39B of the cylinder 38. In certain examples, one or more handles 58 extend between the frame members 98, in further examples being two handles 58 each extending between the frame members 98 and spaced apart from each other (see e.g., FIG. 17).

Figure 3:
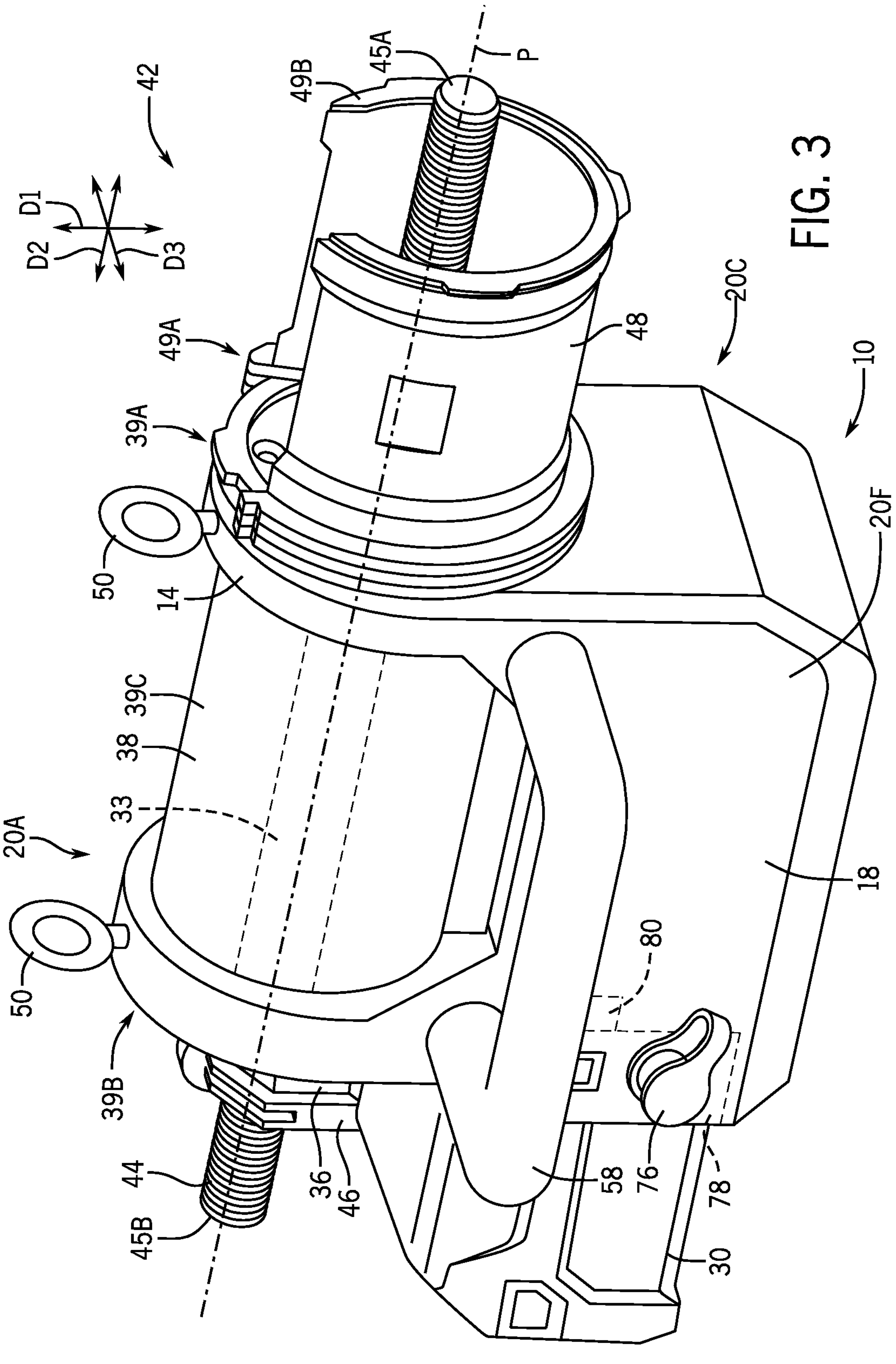
FIG. 3 is a right perspective view of another example of a cylinder assembly configured for operation as a pin puller assembly according to the present disclosure.

The cylinder assembly 10 extends in a first direction D1 between a first end 20A and a second end 20B, in a second direction D2 between a third end 20C and a fourth end 20D, and in a third direction D3 between a fifth end 20E and a sixth end 20F (FIG. 3). The first direction D1 is perpendicular to the second direction D2, which are each perpendicular to the third direction D3. In the illustrated configuration, the cylinder assembly 10 is positioned such that the piston 36 is moveable along a piston axis P that is parallel to the second direction D2. The frame 14 is coupled to the sidewall 39C of the cylinder 38 and support the pump 22 and the motor 26 within the housing 18.

The cylinder assembly 10 of FIGS. 1-3 is adaptable such that it may be configured for use as a pin puller assembly 42 operable to pull a pin 43 from a machine frame F (FIG. 1), as well as for use as a hydraulic jack assembly 100 (FIG. 2), which is discussed further below. The pin puller assembly 42 includes a pull rod 44 that extends between a first end 45A and a second end 45B and is inserted through an axial passage 33 extending through the piston 36 (see FIG. 3). The first end 45A of the pull rod 44 is generally proximate the first end 39A of the cylinder 38 and the second end 45B of the pull rod 44 is generally proximate the second end 39B of the cylinder 38. However, it should be recognized that the pull rod 44 moves relative to the cylinder 38.

The first end 45A of the pull rod 44 is configured to be connected to the pin 43 to be pulled from the machine frame F in a conventional manner, in the illustrated example via threaded engagement between the pin 43 and the pull rod 44. A reaction member 46 is engaged with or coupled to the pull rod 44 on an opposite side of the cylinder 38 from the pin 43. In certain examples, the reaction member is a conventionally known quick reaction nut (e.g., model EAJ1QFN0750U10 by Enerpac Tool Group Corp.) The reaction member may alternatively be a standard nut. The reaction member 46 of the illustrated pin puller assembly 42 threadingly engages with the pull rod 44 and is generally closer than the cylinder 38 to a second end 45B of the pull rod 44. In certain examples, the reaction member 46 abuts an end 37 of the piston 36. In other examples, the reaction member 46 is threaded onto the pull rod 44 into engagement with a conventional saddle (not shown) positioned between the end 37 of the piston 36 and the reaction member 46. The pin puller assembly 42 is then ready to be operated to pull the pin in a conventional manner. Moving the piston 36 away from the first end 39A of the cylinder 38, parallel to the piston axis P, causes the pull rod 44 to move along the piston axis P by virtue of the reaction member 46 abutting the piston 36.

To use the cylinder assembly 10, a battery pack 30 with sufficient capacity and voltage is connected to a battery interface (discussed further below) to provide power for operating the motor 26. The cylinder assembly 10 is positioned for the desired operation, such as arranging relative to the frame F and the pin 43 to be pulled. Any necessary or desired set up operation may be performed on the cylinder assembly 10 (e.g., calibration of the cylinder assembly 10, advance of the piston 36 to contact the load of machine frame F, etc.). Further discussion of the battery pack 30, battery interface, and operation of the motor 26 is provided below.

Figure 38:
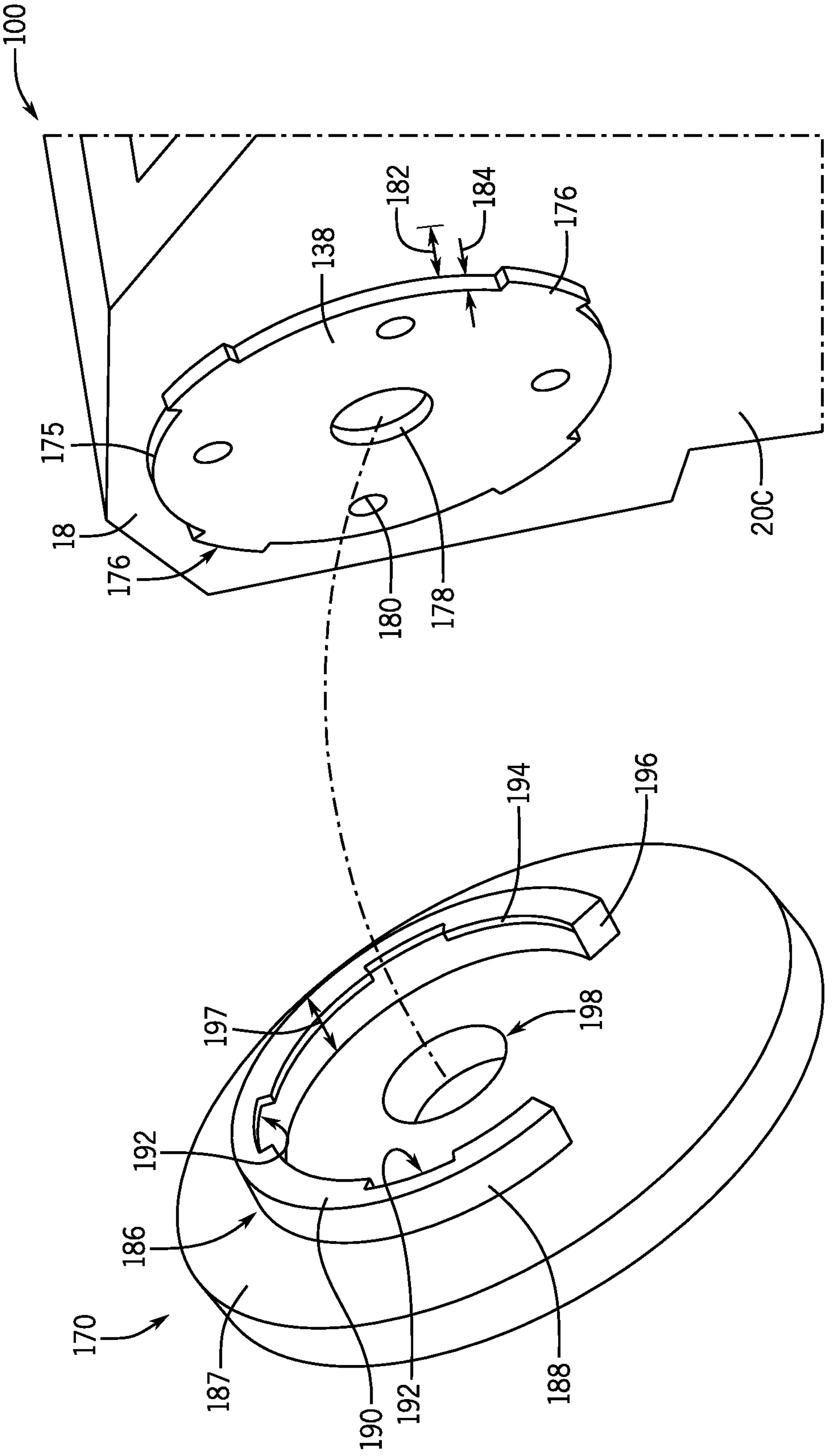
FIG. 38 is a perspective view showing an exemplary base plate being coupled to the cylinder assembly of FIG. 36 for use as the hydraulic jack assembly.

Referring to FIGS. 1-3, one or more column members 48 (functioning as column sections, also referred to simply as columns) are positioned between the piston-cylinder unit 34 and the machine frame F. The column member 48 is coupled or connected at a first end 49A thereof to an attachment plate 138 of the cylinder 38, such as via a twist-lock engagement. The attachment plate 138 may be removeable from the cylinder 38 and is proximate the first end 39A of the cylinder 38. As shown in FIG. 38, the attachment plate 138 has a generally circular perimeter 175, but for a plurality of teeth 176 that extend radially outwardly therefrom. A circular opening 178 is also provided through the attachment plate 138 and is configured to allow a pull rod to extend therethrough without interference. The attachment plate 138 is coupled to cylinder (e.g., via bolts or other fasteners 180) such that a gap 182 remains between the attachment plate 138 and the housing 18. The gap 182 is substantially consistent across the entire attachment plate 138. The attachment plate 138 has a thickness 184.

The attachment plate 138 is configured for coupling a column member 48 (FIG. 1), a base plate 170, or other components thereto, specifically via locking receiver 186 on a base 187 thereof. The locking receiver 186 has a side wall 188 extending perpendicularly from the base 187, which may be coupled to the base plate 170 or column member 48 to be coupled to the cylinder assembly 100, or a part thereof (e.g., being integrally formed together). The locking receiver 186 further includes a shelf 190 that extends perpendicularly from the side wall 188. The side wall 188 and the shelf 190 are together substantially arc-shaped to correspond with the generally circular perimeter 175 of the attachment plate 138. Notches 192 are formed within an inner perimeter 194 of the shelf 190, which are configured to receive the teeth 176 of the attachment plate 138 therein. The side wall 188 is configured such a gap 197 between the shelf 190 and the base 187 is at least as large as the thickness 184 of the attachment plate 138.

In use, the locking receiver 186 allows a column member 48 (FIG. 1), a base plate 170, or another component to be removably coupled to the cylinder assembly 10 via a twist-lock motion. In particular, the attachment plate 138 is inserted into the locking receiver 186 such that the teeth 176 are received through the notches 192 of the shelf 190. The locking receiver 186 and/or the attachment plate 138 is rotated relative to the other such that the teeth 176 are retained by the shelf 190 to prevent separation of the locking receiver 186 from the attachment plate 138. Rotation is stopped when one of the teeth 176 of the attachment plate 138 abuts an end wall 196 of the locking receiver 186 also coupling the base 187 to the shelf 190, here being perpendicular to the side wall 188. In certain examples, the twist-lock coupling of the locking receiver 186 and the attachment plate 138 is provided with a rotation of approximately 45 degrees. An opening 198 is also provided through the center of the base 187, which is configured to allow a pull rod to extend therethrough without interference (e.g., when the base plate 170 is coupled to the cylinder assembly 10 rather than a column member 48).

In certain examples, column members 48 have a locking receiver 186 at one end and an attachment plate 138 at the opposite end. This engages multiple column members 48 to be stacked on top of each other as needed to fully extract a pin from a machine, essentially twist-locking hem end to end (e.g., HPR series columns from Hi-Force Hydraulic Tools of the UK). Additional information regarding the stacking of columns can be found in International Application No. PCT/US2022/051434. A second 49B of the column member 48 opposite the first end 49A is positioned against the machine frame F. In this manner, the column member 48 is positioned between the cylinder 38 and the machine frame F when pulling the pin 43 therefrom.

Returning to FIGS. 1-3, the user controls the cylinder assembly 10 with a remote-control device discussed further below (e.g., the pendant 66 of FIG. 6) to complete the associated operation, such as a pin pulling stroke. The motor 26 is powered and drives the pump 22 to supply hydraulic fluid to the piston-cylinder unit 34. As fluid flows into the cylinder 38, the piston 36 extends axially outwardly from the cylinder 38 along the piston axis P. As the piston 36 is extended, the pull rod 44 and pin 43 are moved axially as well. Engagement between the end 37 of the piston 36 and the reaction member 46 causes the reaction member 46 to transfer the force that the hydraulic fluid applies to the piston 36 to the pull rod 44. The column member 48 bears against the machine frame F to provide a reaction force against the piston-cylinder unit 34. To maintain the piston-cylinder unit 34 in a stationary position, the column member 48 transfers the reaction force between the cylinder 38 and the column member 48 to the machine frame F. Accordingly, movement of the piston 36 removes the pin 43 from the machine frame F.

If the length of the stroke of the piston 36 (e.g., about 2 in. to about 4 in.) is shorter than length of the pin (typically, between about 10 in. to about 20 in.), the pin puller assembly 42 is adjusted to continue the pulling operation. If the length of the one or more assembled column members 48 (e.g., the length of each column member is about 6.5 in.) is sufficient for another stroke of the piston 36, the pin puller assembly 42 is reset. The reaction member 46 is disengaged from the piston 36, and the piston 36 is retracted with hydraulic fluid exiting the piston-cylinder unit 34. The reaction member 46 is re-engaged with the piston 36, and hydraulic fluid is supplied to the cylinder 38 to extend the piston 36 and pull the pin.

If the length of the assembled one or more column members 48 is not sufficient for another piston stroke, the pin puller assembly 42 is reset and another column member 48 is added. The pin puller assembly 42 is then operated to provide a sufficient number strokes of the piston 36 to remove the pin from the machine frame F. Once the pin is removed from the machine frame F, the pin puller assembly 42 remains supported at the rigging points 50. The pin puller assembly 42 may then be disassembled and returned to a case for storage, transport, etc. or assembled in another location for use in pulling another pin or for another operation (e.g., a lifting operation with the cylinder assembly 10).

Figure 19:
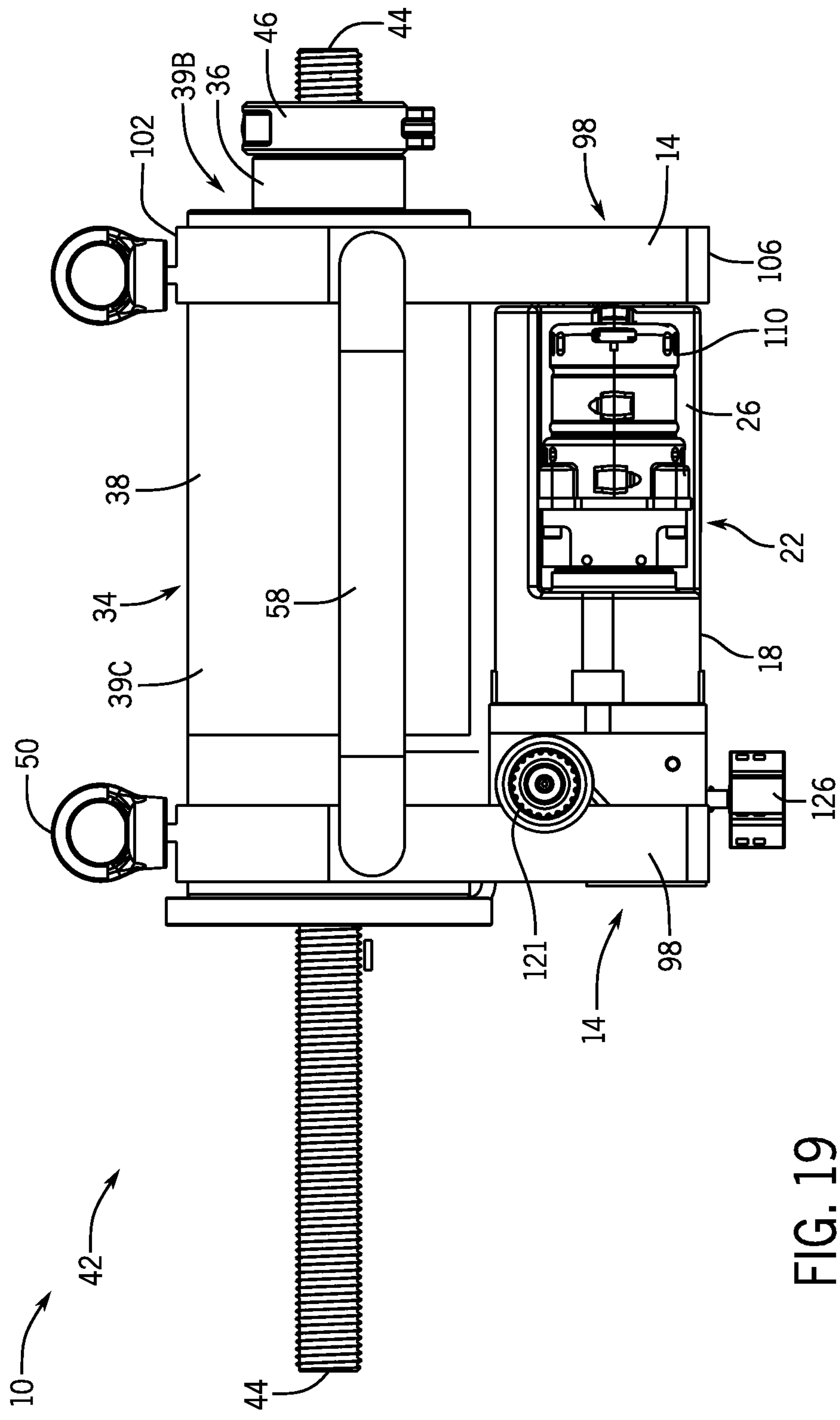
FIG. 19 is a left view of the pin puller assembly of FIG. 17.
Figure 24:
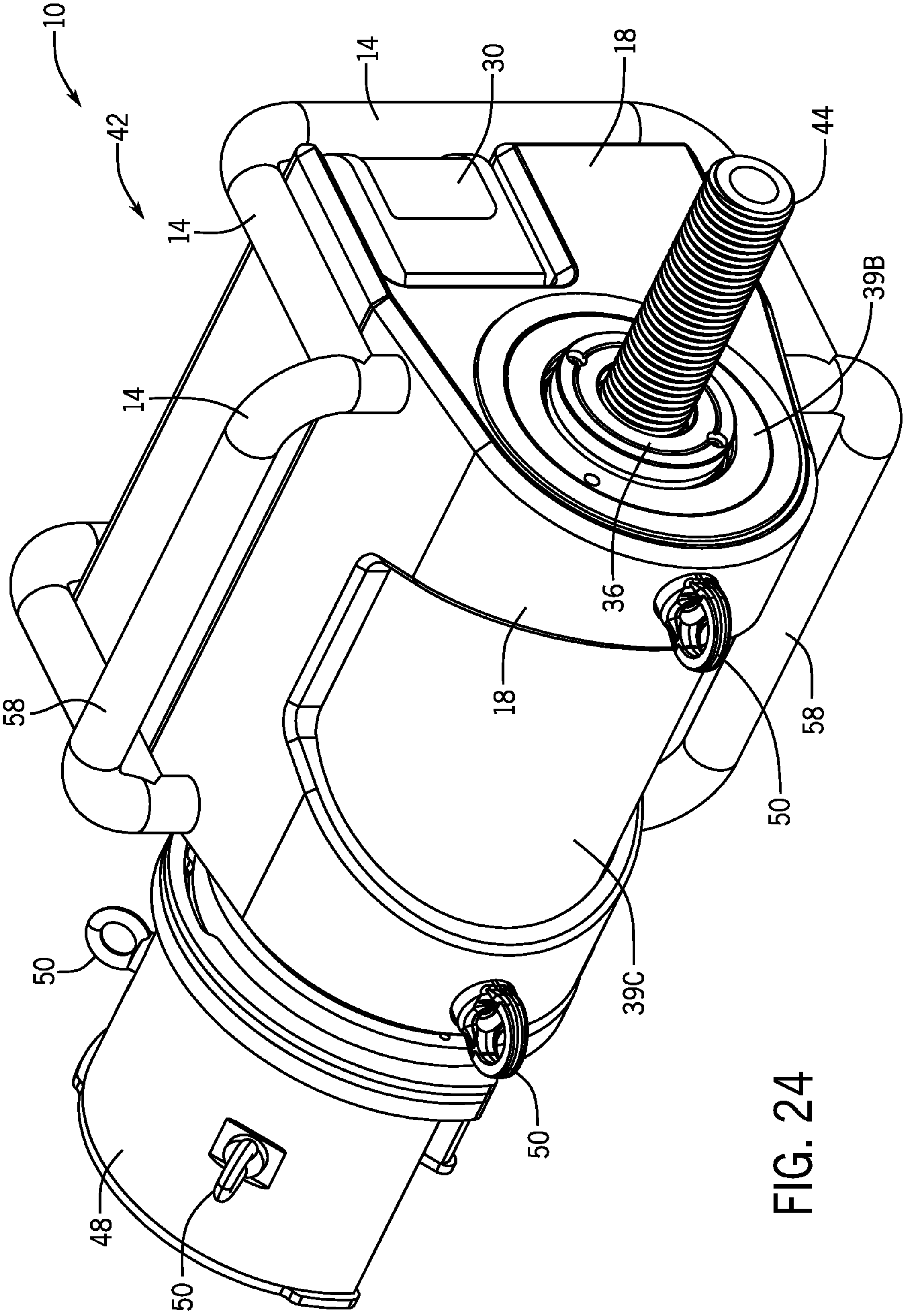
FIG. 24 is a top perspective view of another example of a cylinder assembly configured for operation as a pin puller assembly according to the present disclosure.

With reference to FIG. 1, at least one lifting eye or rigging point 50 is provided proximate the first end 20A of the cylinder assembly 10. In certain examples, the rigging point 50 is coupled to the frame 14, including having a first rigging point connected to a first frame member and a second rigging point connected to a second frame member (see e.g., the rigging points 50 and the frame members 98 of FIG. 19). Rigging points 50 may also or alternatively be provided elsewhere, such as on the column member 48 (see FIG. 24). The rigging point 50 is connected to a rope, chain, cable 54 or other support to support at least a portion of the cylinder assembly 10 above the ground. The rigging points 50 may include removable eyes that are threaded into openings in the frame 14, column member 48, or elsewhere.

With continued reference to FIG. 1, two handles 58 are disposed on opposite sides of the frame 14 and/or the housing 18, here each to provide a T-handle shape. The handles 58 are configured for an operator to hold, support, and control the cylinder assembly 10. In the illustrated construction, the battery pack 30 is supported on the upper side of the cylinder assembly 10 with the power unit supported below the piston-cylinder unit 34. The handles 58 may also be referred to as being part of the frame 14. In the orientation of FIG. 1, whereby the cylinder assembly 10 is configured for use as a pin puller assembly 42, the one or more rigging points 50 are used to maintain the position of the pin puller assembly 42 relative to the machine frame F while the pin 43 is removed therefrom.

The cylinder assembly 10 is configured with limited and/or removable components (e.g., a removable pull rod 44, a removable column member 48, etc.) at its ends (e.g., in "no fly zones," shown as NFZs). This advantageously allows the same cylinder assembly 10 to not be impeded from being rotated 90 degrees to be positioned on the ground or on another support surface 55 for use as a hydraulic jack assembly 100, as shown in FIG. 2. In particular, in FIG. 2 the third end 20C of the cylinder assembly 10 faces downwardly when the cylinder assembly 10 is operated in a hydraulic jack assembly 100, whereas the second end 20B faces downwardly when the cylinder assembly 10 is operated in the pin puller assembly 42 of FIG. 1.

Figure 5:
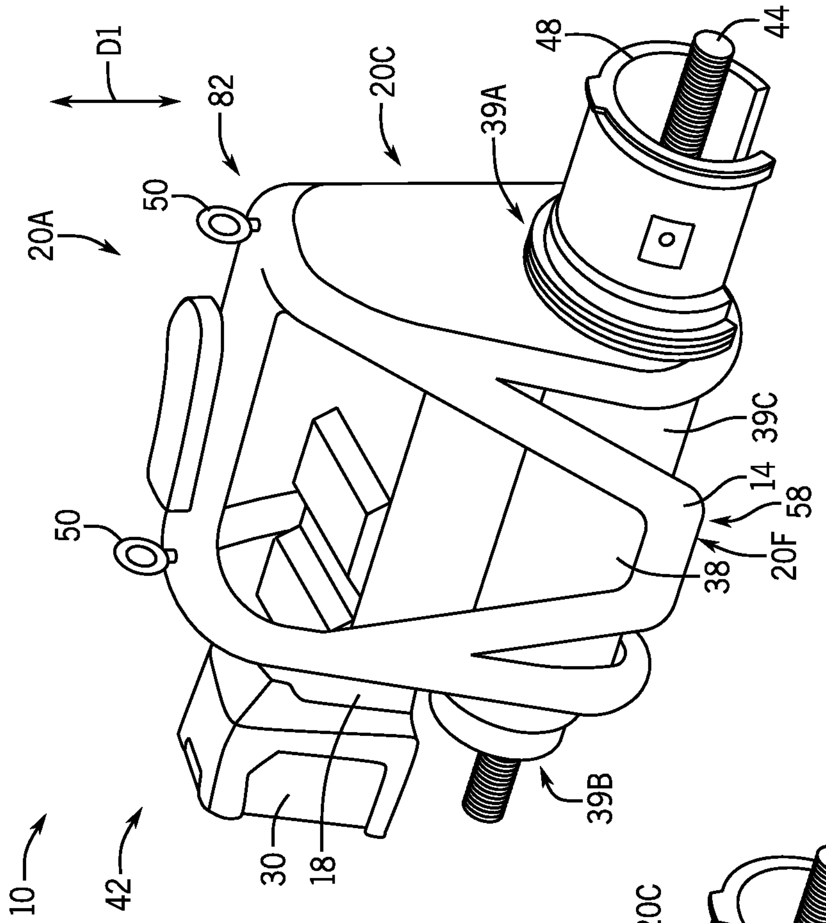
FIG. 5 is a right perspective view of another example of a cylinder assembly configured for operation as a pin puller assembly according to the present disclosure.
Figure 4:
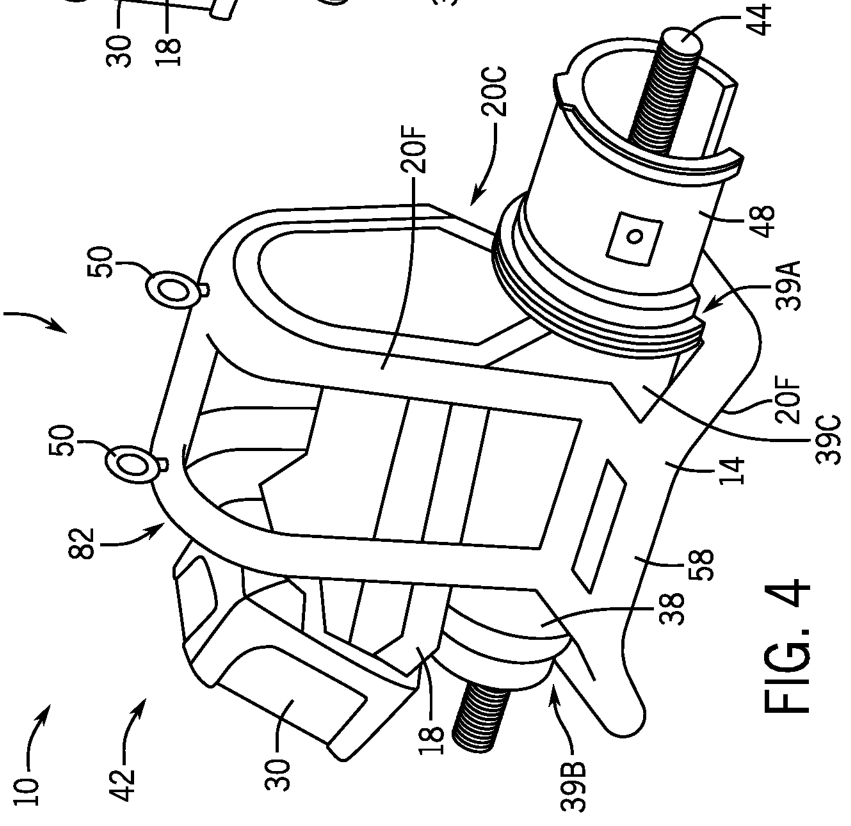
FIG. 4 is a right perspective view of another example of a cylinder assembly configured for operation as a pin puller assembly according to the present disclosure.

Additional embodiments of pin puller assemblies 42 according to the present disclosure are shown in FIGS. 3-5. Each of the cylinder assemblies 10 of FIGS. 3-5 includes two rigging points 50 proximate the first end 20A of the cylinder assembly 10. For the pin puller assembly 42 of FIG. 3, the piston axis P of the piston-cylinder unit 34 is positioned closer than the battery pack 30 to the rigging points 50 in the first direction D1. In other words, the battery pack 30 is positioned below the cylinder 38 when the pin puller assembly 42 is suspended in use to pull a pin. At least one U-shaped side handle 58 is provided on at least one side (e.g., sixth end 20F) of the cylinder assembly 10.

In contrast, the pin puller assemblies 42 of FIGS. 4 and 5 each provide for the battery pack 30 being positioned closer than the piston axis P of the piston-cylinder unit 34 to the rigging points 50 in the first direction D1. In each of these embodiments the battery pack 30 is positioned above the cylinder 38 when the pin puller assembly 42 is suspended in use to pull a pin.

The frames 14 of FIGS. 4 and 5 can also be described as including roll cages 82 that surrounding portions of the housing 18 (e.g., the power unit). The roll cages 82 also function as one or more of the handles 58, with the rigging points 50 being connected to the roll cage 82. Although the handles 58 are shown positioned at the second end 20B of the frame 14, additional or alternative locations are also contemplated. FIG. 4 shows the frame 14 bending or otherwise extending outwardly from the housing 18 for the regions forming the handles 58 to provide clearance for the hands of the operator. Additionally, the frames 14 in the examples of FIGS. 4 and 5 provide additional height for the cylinder assemblies 10 over other examples (e.g., FIG. 3). This additional height provides additional protection for the upper side of the housing 18 (in the orientation shown), as well as for the battery pack 30. The additional height also allows the top-most portion of the frame 14 to also function as a handle and/or to serve as a convenient position for mounting a pendant (see e.g., FIG. 5).

The frames 14 of FIGS. 4 and 5 also flare outwardly away from the housing 18 at the bottom of the housing 18 (in the orientation shown) to widen the footprint of the cylinder assembly 10 to thereby provide increased stability.

Figure 6:
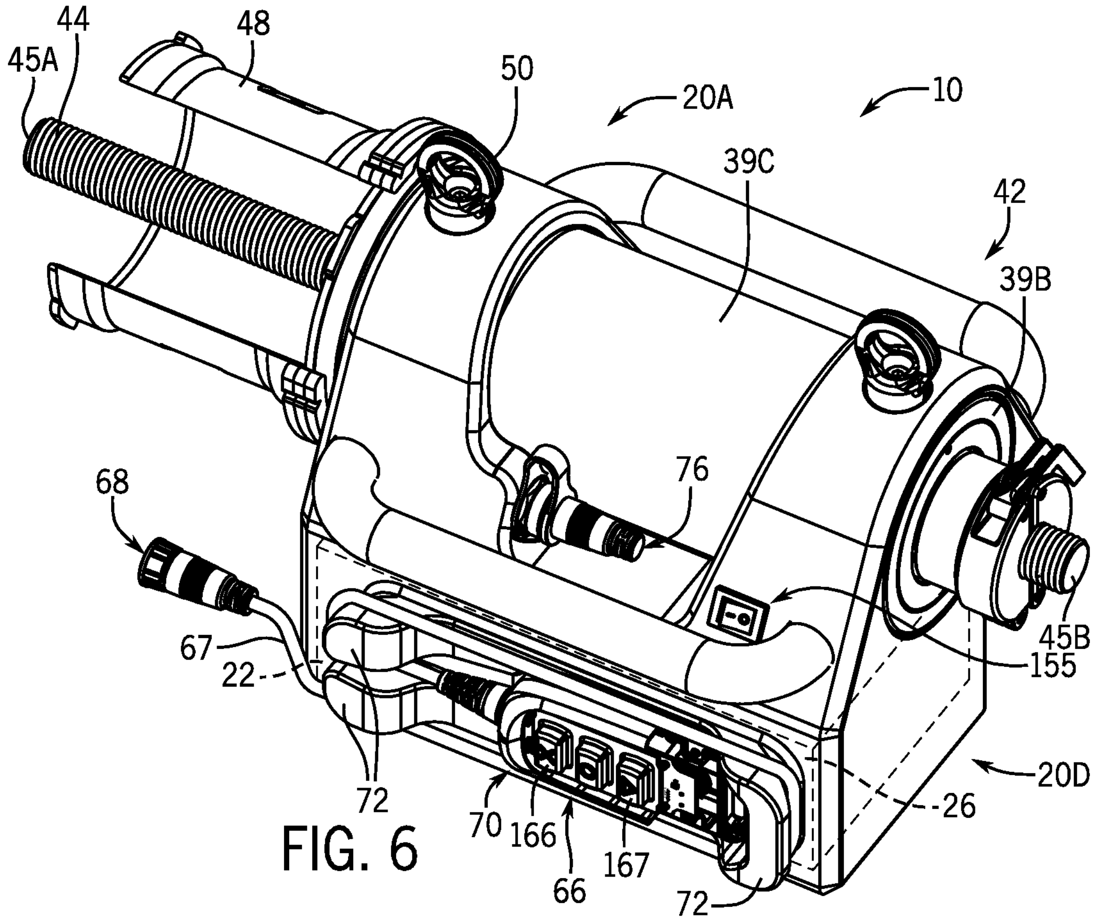
FIG. 6 is a left perspective view a pin puller assembly similar to that of FIG. 3.
Figure 7:
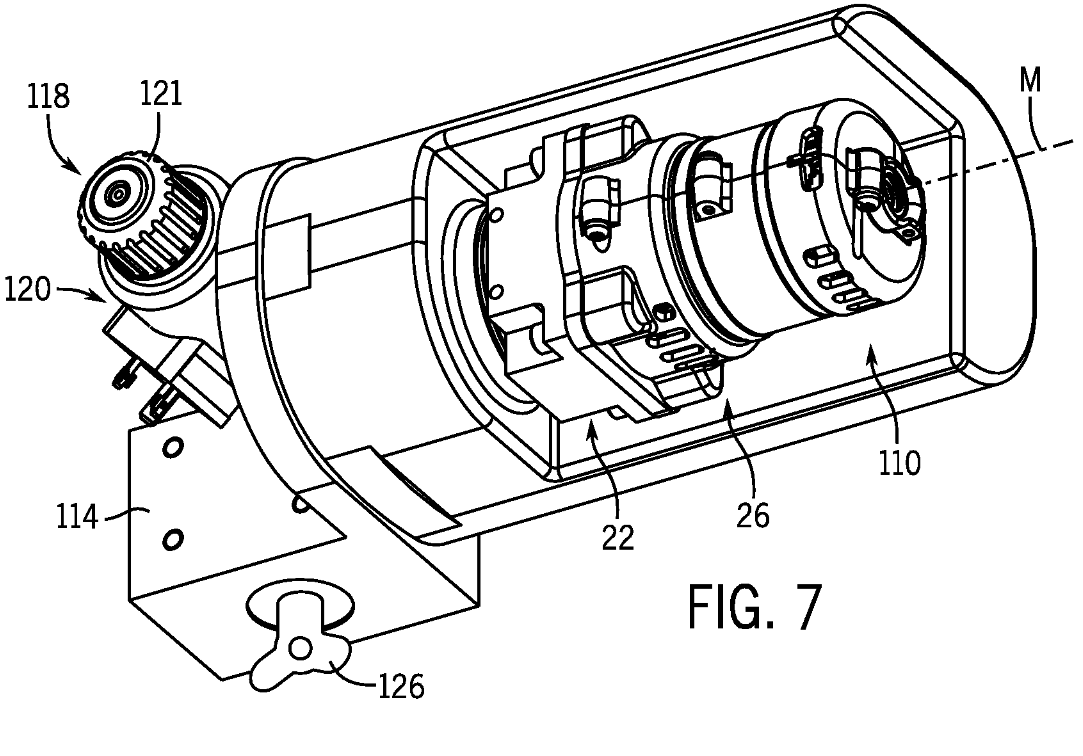
FIG. 7 is a perspective view of a portion of the pin puller assembly shown in FIG. 6.
Figure 8:
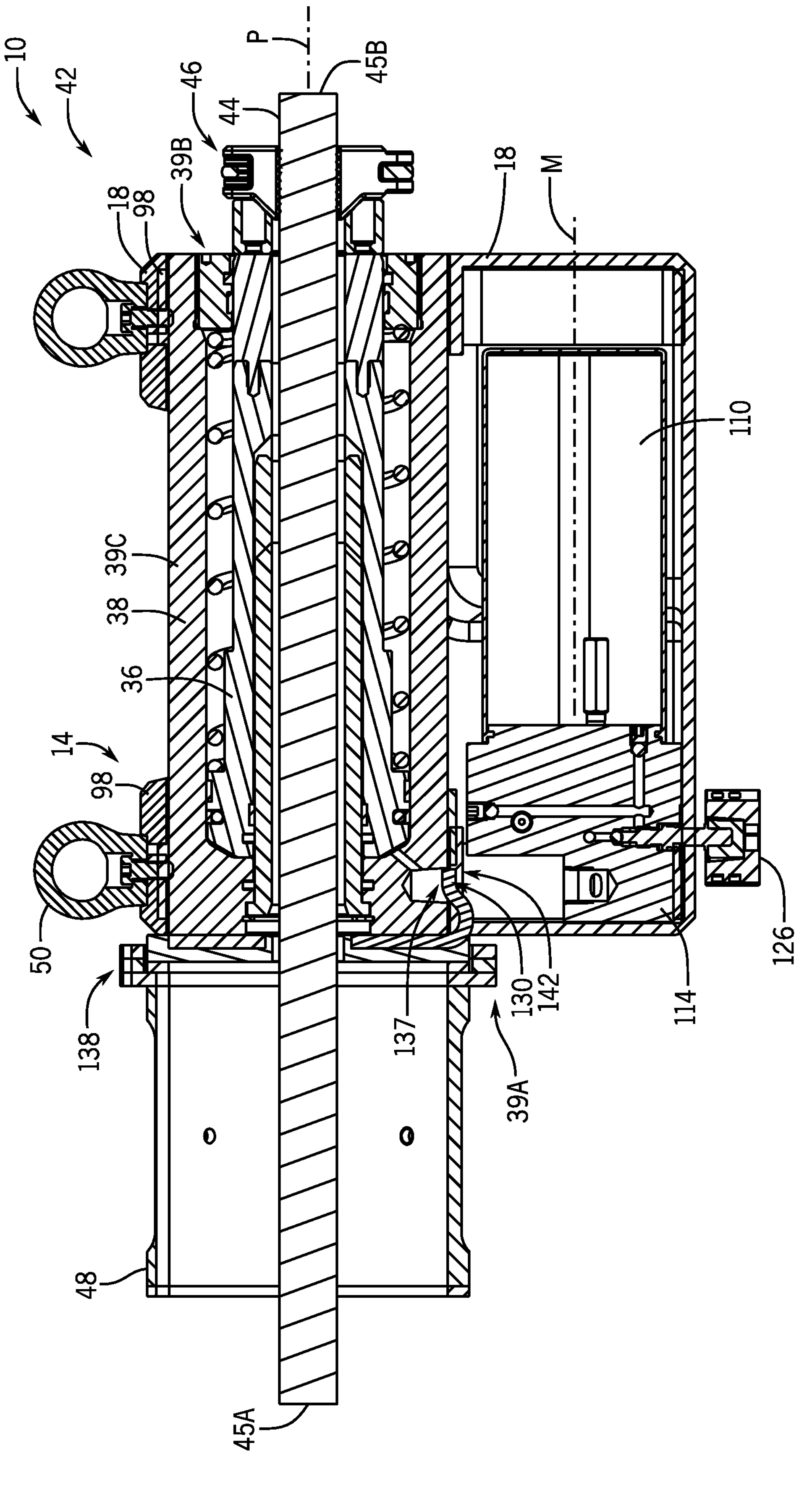
FIG. 8 is a cross-sectional side view of the pin puller assembly of FIG. 6.

With reference to FIGS. 6-8, additional information is now provided for the flow of hydraulic fluid throughout the cylinder assembly 10, including details on the pump 22, the motor 26, and the battery pack 30 that provides power thereto. The pump and motor may be of a type presently known in the art, such as model XC1502T used within XC pumps produced by Enerpac Tool Group Corp. or other known devices. Further information can also be found in PCT Application Publication No. WO2023018993A1, which is incorporated by reference in entirety herein. The cylinder assembly 10 includes a valve assembly 118 with a valve block 114 (also referred to as a hydraulic manifold) that is operatively coupled to the pump 22 to supply hydraulic fluid to the piston-cylinder unit 34. The valve assembly 118, including a solenoid-controlled dump valve, is connected to the valve block 114 to control the flow of hydraulic fluid from the valve block 114 in a conventional manner. The valve assembly 118 may be of a type conventionally known, such as model DC5142660SR by Enerpac Tool Group Corp.

The cylinder assembly 10 includes a reservoir 110 configured to contain hydraulic fluid and to be in fluid communication with the pump 22. In certain examples, the reservoir 110 is mounted on the valve block 114. In certain examples, the reservoir 110 includes a shell housing that includes a flexible bladder (not shown) to facilitate use of the cylinder assembly 10 in multiple orientations. One example of a commercially available flexible bladder is model XC1201 MB by Enerpac Tool Group Corp. The reservoir 110 may include a fill cap (not shown) within or extending from the housing 18 to receive hydraulic fluid into the reservoir 110. In the illustrated construction, the cylinder assembly 10 uses hydraulic oil formulated for pumps (e.g., having the desired volumetric efficiency, heat transfer, cavitation prevention, additives to limit or prevent sludge, rust, oxidation, foam, etc.). In other constructions (not shown), the cylinder assembly 10 may use different types of hydraulic fluid, such as, for example, a different hydraulic oil, mineral oil, etc., or a different fluid, such as, for example, air (e.g., an air cylinder powered by an onboard compressed air pump).

The reservoir 110 has a base with an oval shape mounted on (e.g., bolted to) the valve block 114. The pump 22 extends into an opening in the reservoir 110 and is also mounted on the valve block 114. The motor 26 is supported on the pump 22 and includes a drive shaft (not shown)

connected to and driving the pump 22. The drive shaft rotates about a power unit axis M. As shown in FIGS. 7 and 8, the valve block 114 is mounted on portion of the frame 14 (e.g., on a frame member 98 in the example of FIG. 19). The power unit (i.e., the pump 22 and the motor 26) and the reservoir 110 are supported on the valve block 114 and, therethrough, also on the frame 14 (e.g., on the frame member 98). However, the present disclosure also contemplates configurations in which one or more of the pump 22, the motor 26, and the reservoir 110 are supported other than by the valve block 114, such as being mounted directly onto the frame 14 rather than being supported via the valve block 114.

As shown in FIGS. 7 and 8, the reservoir 110 extends at least partially around the pump 22 to thereby at least partially surrounds the pump 22 and the motor 26, providing a relatively larger reservoir 110. A first portion of the reservoir 110 is positioned between the piston-cylinder unit 34 and the pump 22. A second portion of the reservoir 110 extends along a side of the pump 22 such that the reservoir extends partially around the pump 22 and the motor 26.

The valve block 114 defines one or more passages selectively in fluid communication between the pump 22 and the cylinder 38. The valve assembly 118 of the illustrated cylinder assembly 10 includes a solenoid valve control system 120 with a valve actuator 121 and a relief valve actuator 126 extending from the side of the housing 18. The relief valve actuator 126 allows a user to manually control the speed at which the piston 36 is lowered by controlling the rate at which hydraulic fluid is "dumped" from the cylinder 102. A conduit 130 connects (see FIG. 8) the valve block 114 to the cylinder 38.

The illustrated piston-cylinder unit 34 is a single-acting unit, and the cylinder 38 has a port 137 in fluid communication with a pump port 142. Through the supply of hydraulic fluid through the port 137, the pump 22 causes the piston 36 to advance and retract along a piston axis P through the first end of the cylinder 38. In other constructions (not shown), the piston-cylinder unit 34 may be a double-acting unit having another cylinder port communicating with the chamber on the other side of the piston 36. An example of a commercially available double-acting unit is model RRCH660 by Enerpac Tool Group Corp.

In the illustrated construction, the pump 22 is a hydraulic pump (e.g., a micro-hydraulic pump). The micro-hydraulic pump may have a piston with a diameter of between about 4 millimeters (mm; about 0.157 inches (in.)) and about 8 mm (about 0.315 in.), with a flow rate of between about 15 cubic inches per minute (in3/min) and about 40 in3/min (e.g., 18 in3/min at full load), and a pressure output of up to about 10,000 pounds per square inch (psi). In some constructions, the micro-hydraulic pump may include a multi-stage pump with more than one piston, each with the same or different diameter.

In other constructions, the micro-hydraulic pump may have a piston (or pistons) with a different diameter (e.g., up to about 3 mm, between about 30 mm and about 50 mm). The micro-hydraulic pump may also produce a different flow rate (e.g., up to about 65 in3/min) or pressure output (e.g., between about 3,500 psi and about 10,000 psi).

Figure 9:
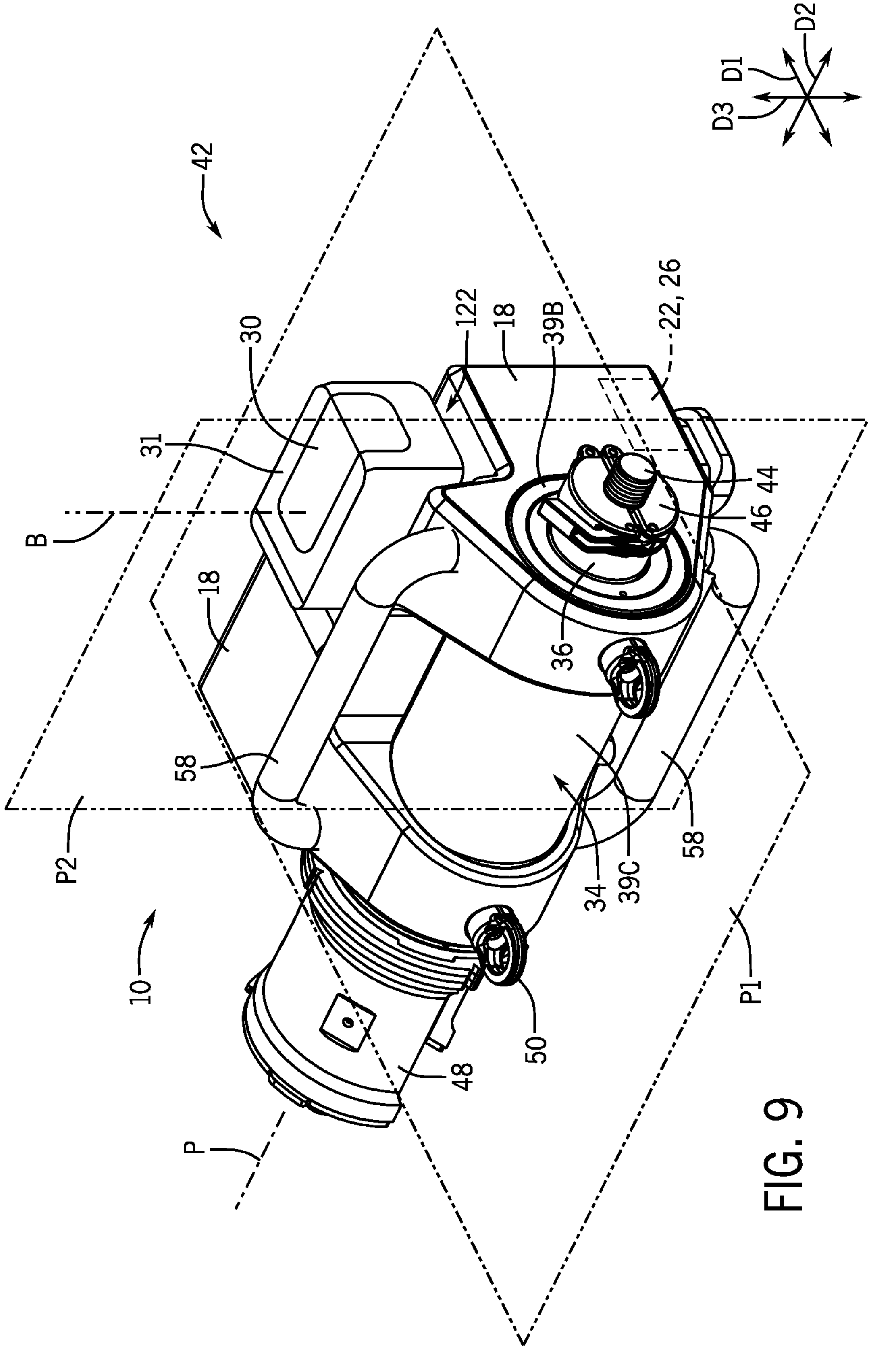
FIG. 9 is a top perspective view of another example of a cylinder assembly configured for operation as a pin puller assembly according to the present disclosure.
Figure 10:
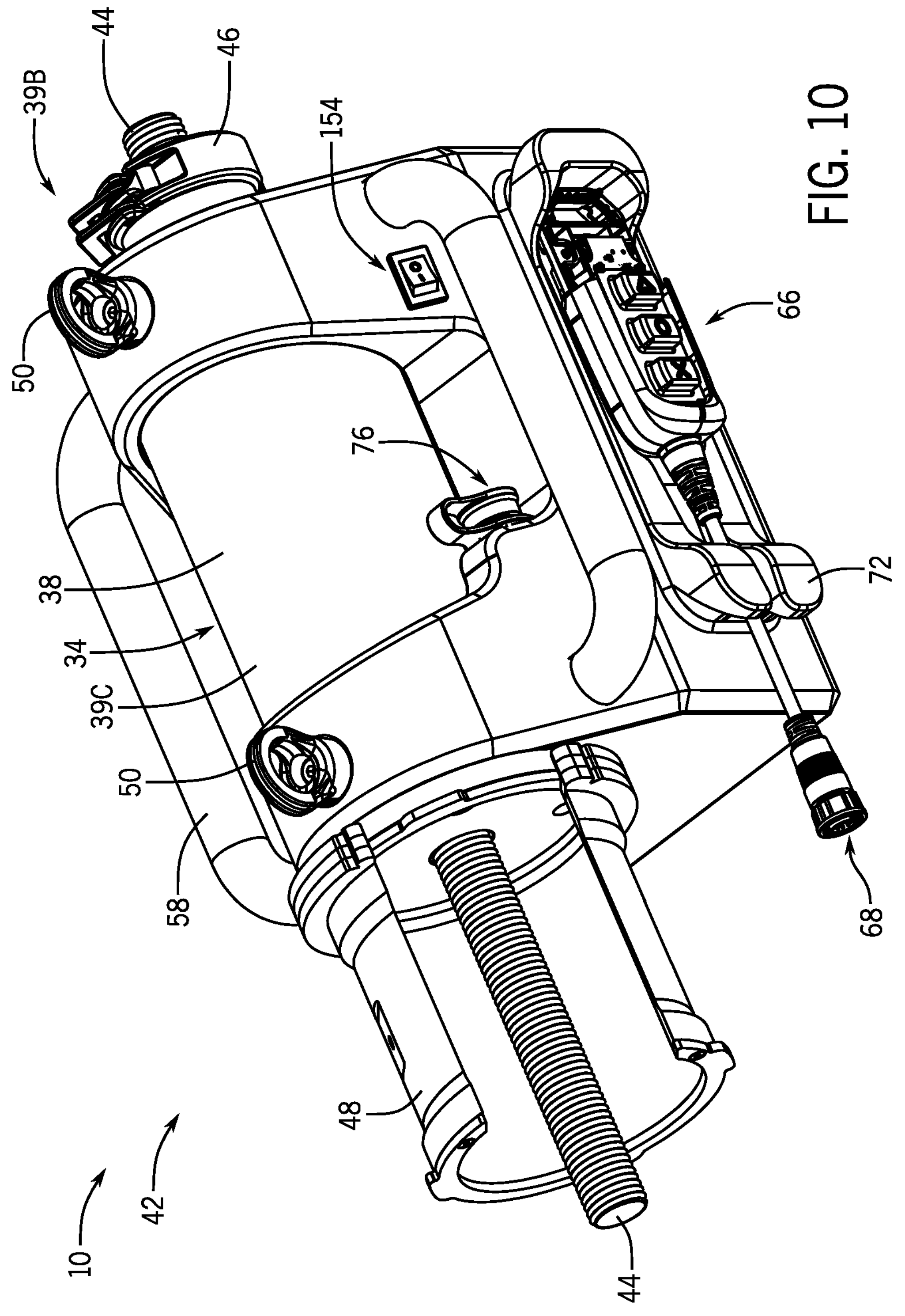
FIG. 10 is a left perspective view of the pin puller assembly of FIG. 9.
Figure 11:
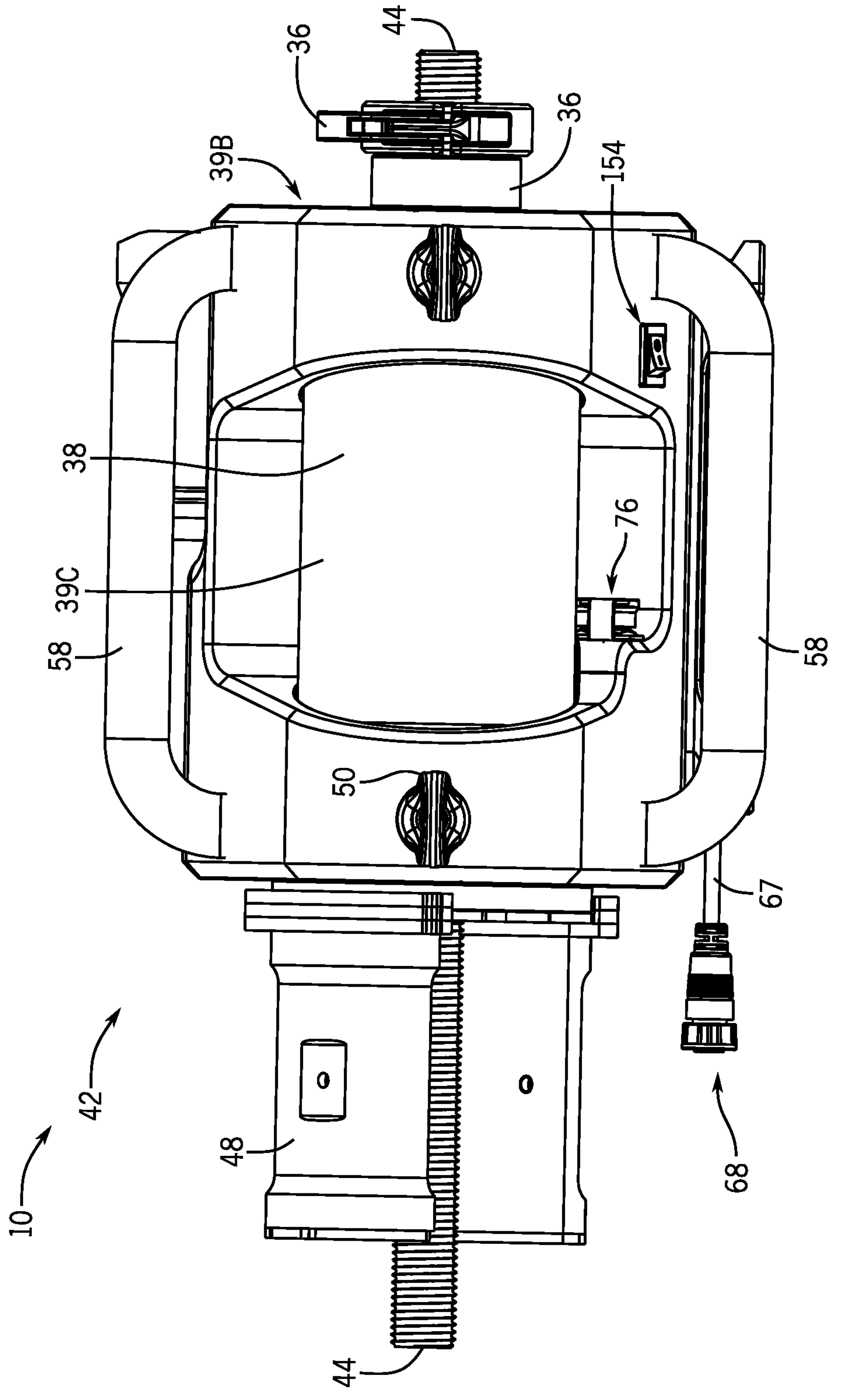
FIG. 11 is a top view of the pin puller assembly of FIG. 9.
Figure 12:
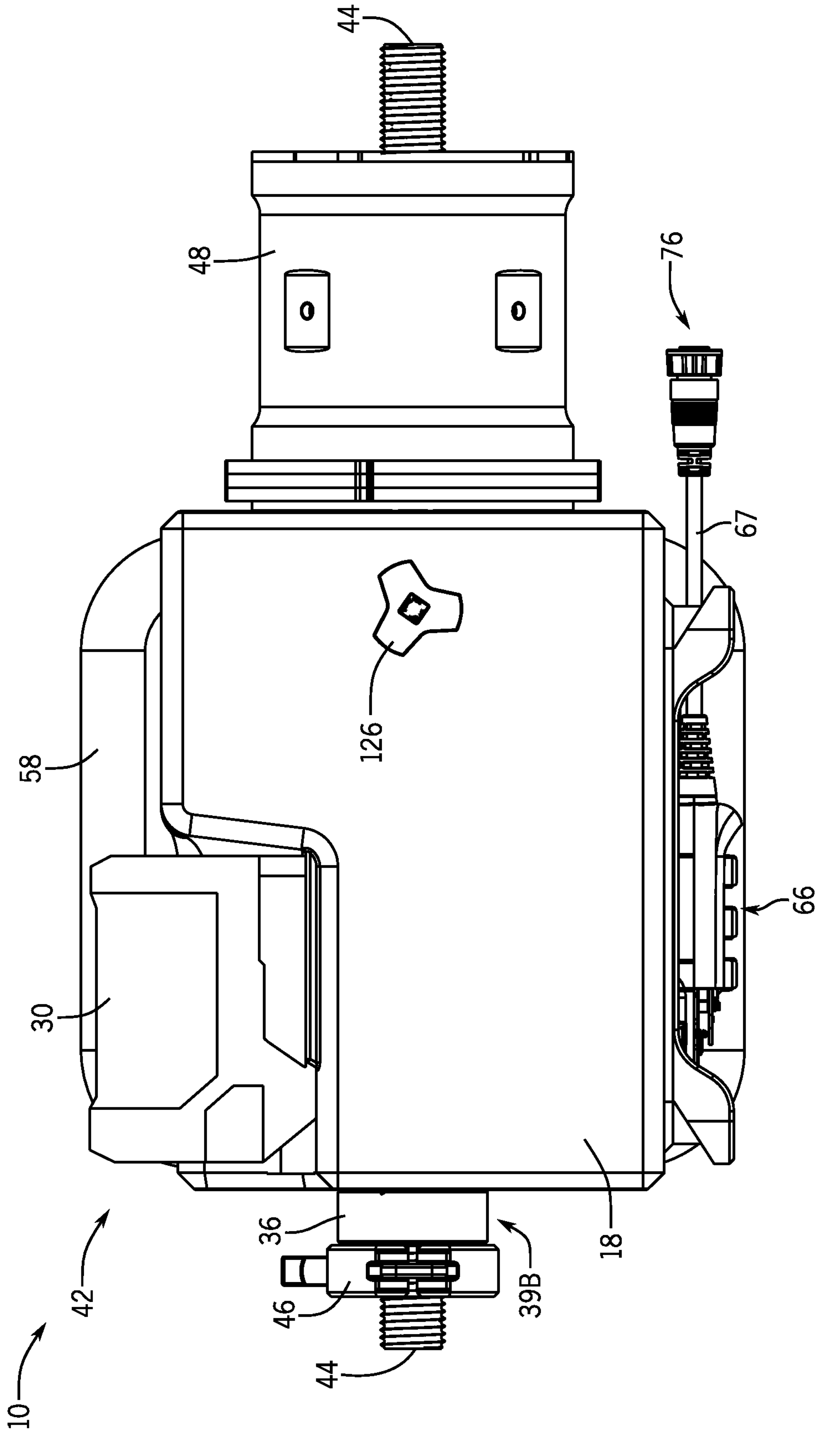
FIG. 12 is a bottom view of the pin puller assembly of FIG. 9.
Figure 13:
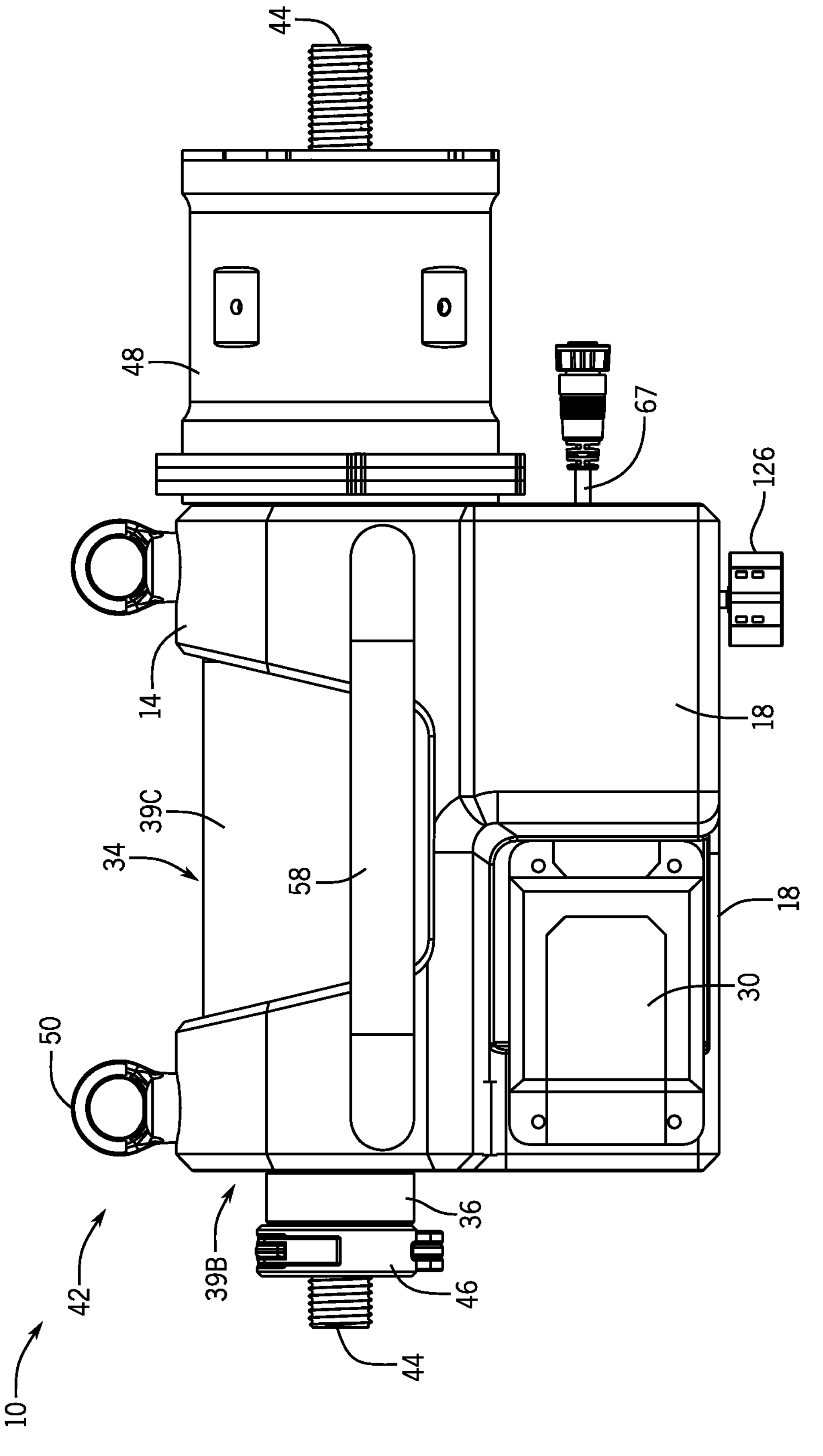
FIG. 13 is a right view of the pin puller assembly of FIG. 9.
Figure 14:
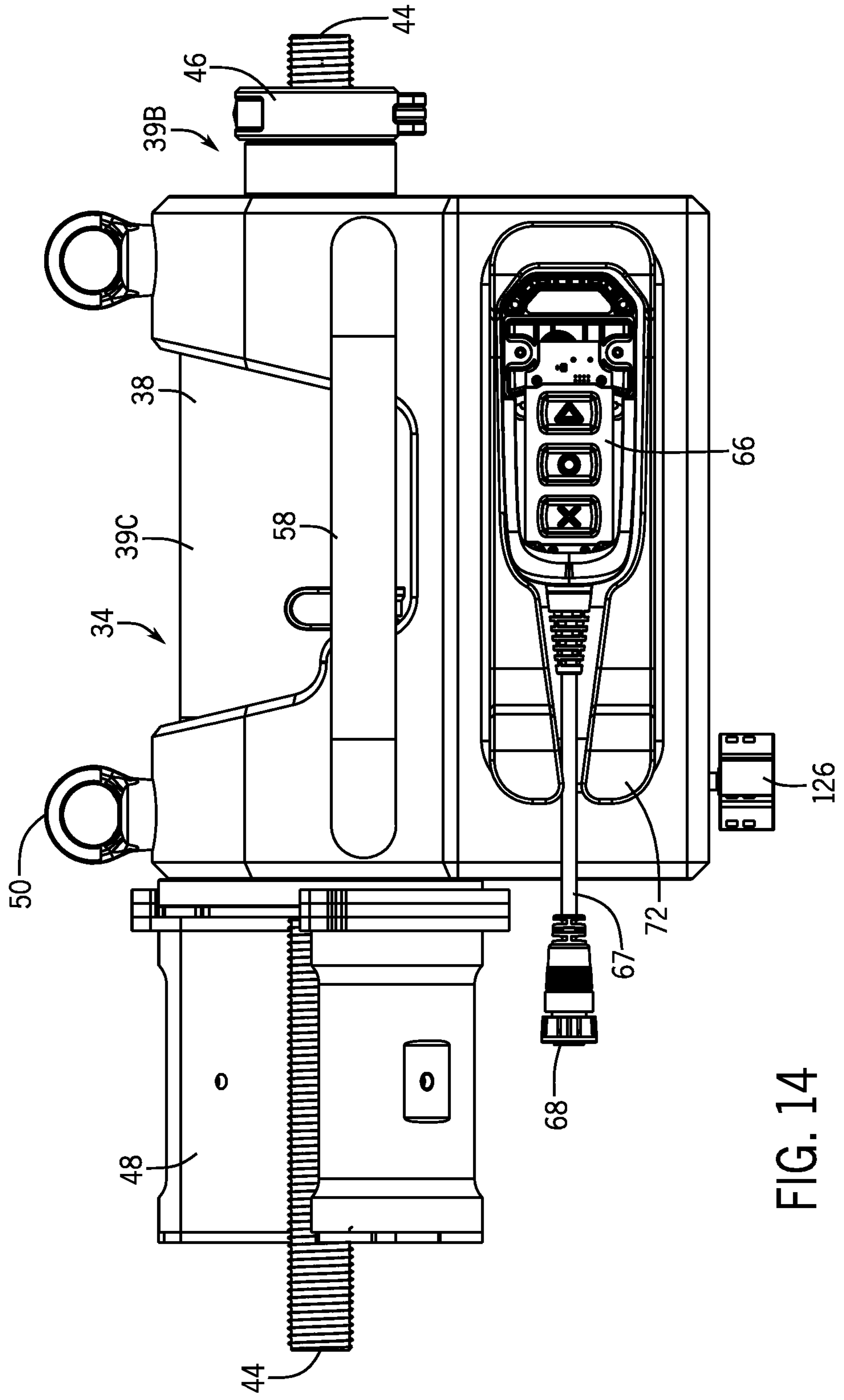
FIG. 14 is a left view of the pin puller assembly of FIG. 9.
Figure 15:
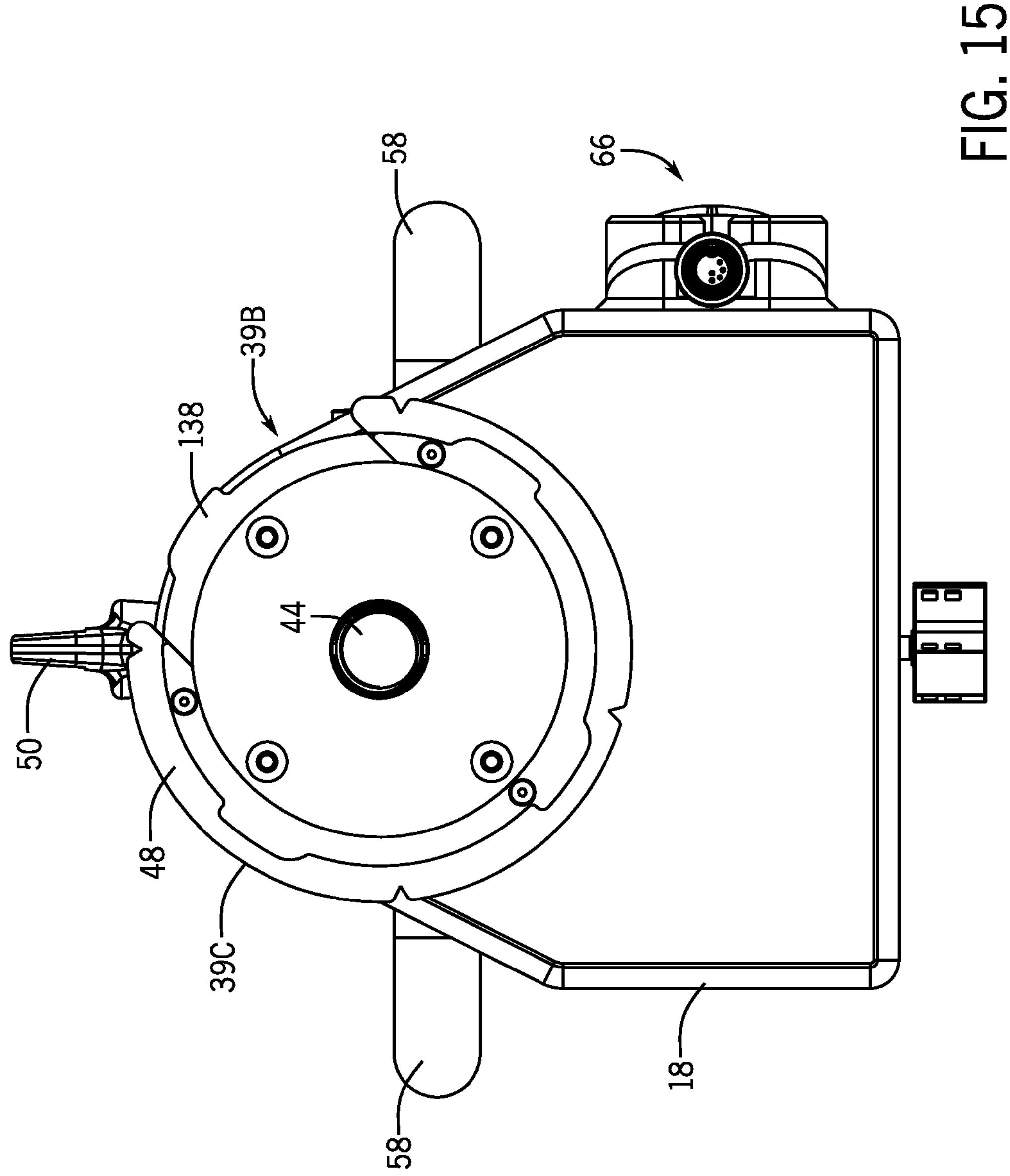
FIG. 15 is a front view of the pin puller assembly of FIG. 9.

The motor 26 is an electric motor powered by an electrical power source (e.g., the battery pack 30). As shown in FIG. 9, the housing 18 defines a battery receptacle or compartment 122 into which the battery pack 30 is received. The battery compartment 122 is located on one side of the piston-cylinder unit 34. The battery compartment 122 allows for the battery pack 30 to be vertically slid into the compartment 122 (i.e., perpendicularly towards the housing 18), for easy insertion/removal. The battery pack 30 has an interface that mates with an interface 127 within the battery compartment 122 such that an electrical connection is made therebetween. The interface 127 may be configured in a manner known in the art. The interface 127 is also electrically coupled to the motor 26 such that the battery pack 30 provides power to the motor 26. In certain examples, the interface 127 also provides a mechanical connection to retain the battery pack 30 in engagement with the compartment 122 (e.g., unless an unlock feature on the battery pack 30 or the housing 18 is depressed to unlock this engagement between the battery pack 30 and the compartment 122).

Figure 20:
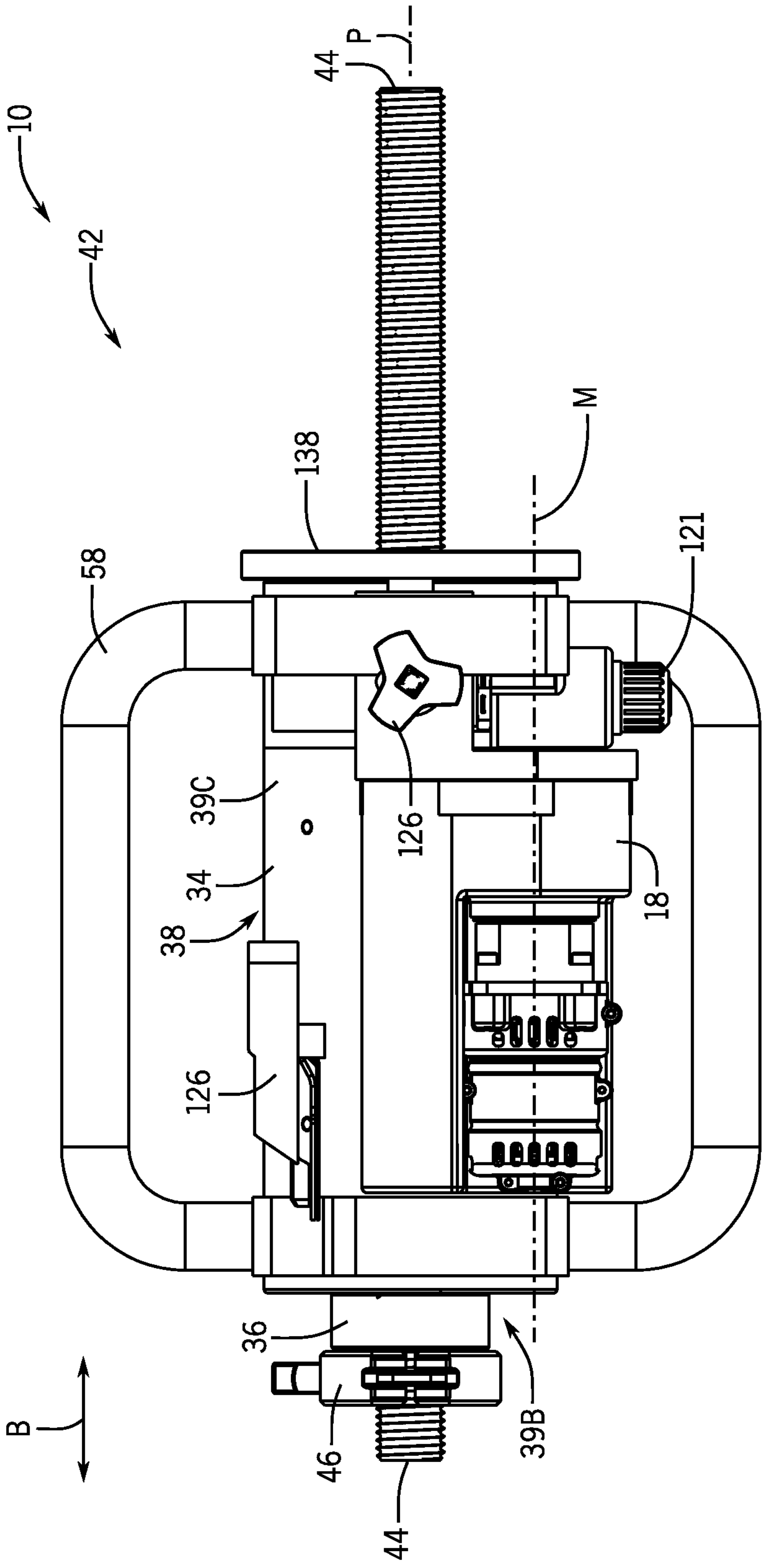
FIG. 20 is a bottom view of the pin puller assembly of FIG. 17.
Figure 21:
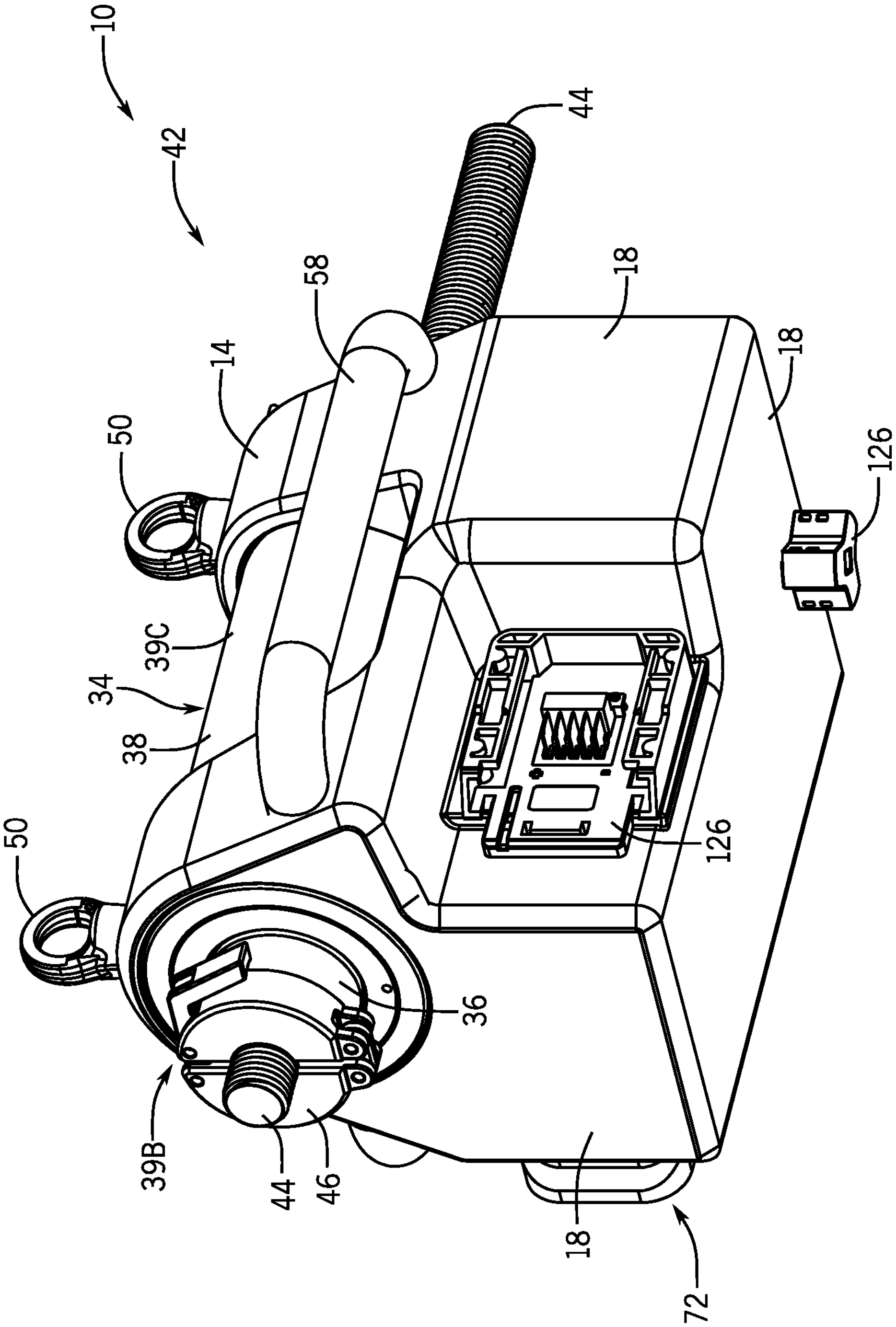
FIG. 21 is a right perspective view of a pin puller assembly such as that shown in FIG. 9, illustrated with the battery pack removed.
Figure 22:
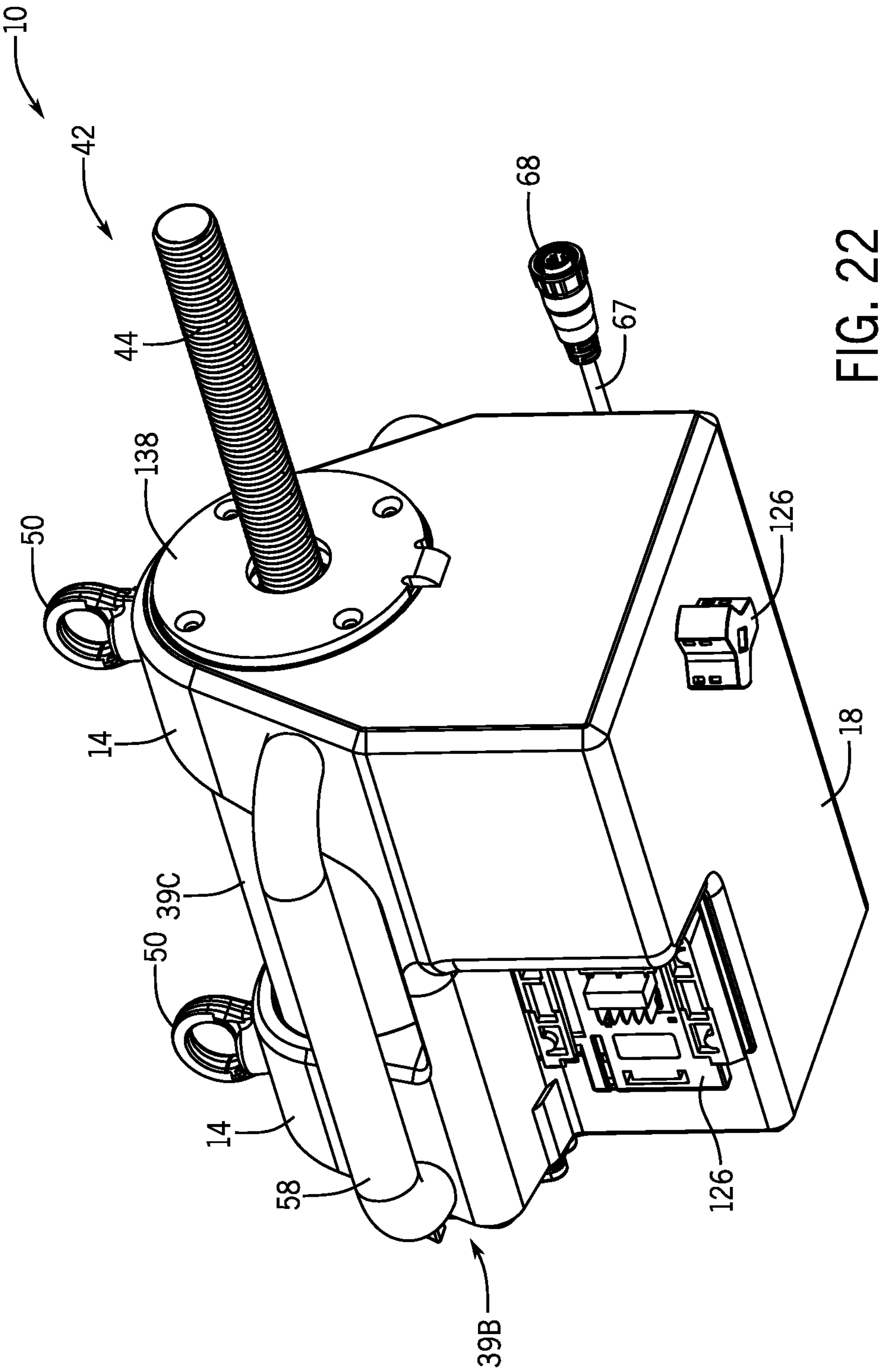
FIG. 22 is another right perspective view of the pin puller of FIG. 21.
Figure 23:
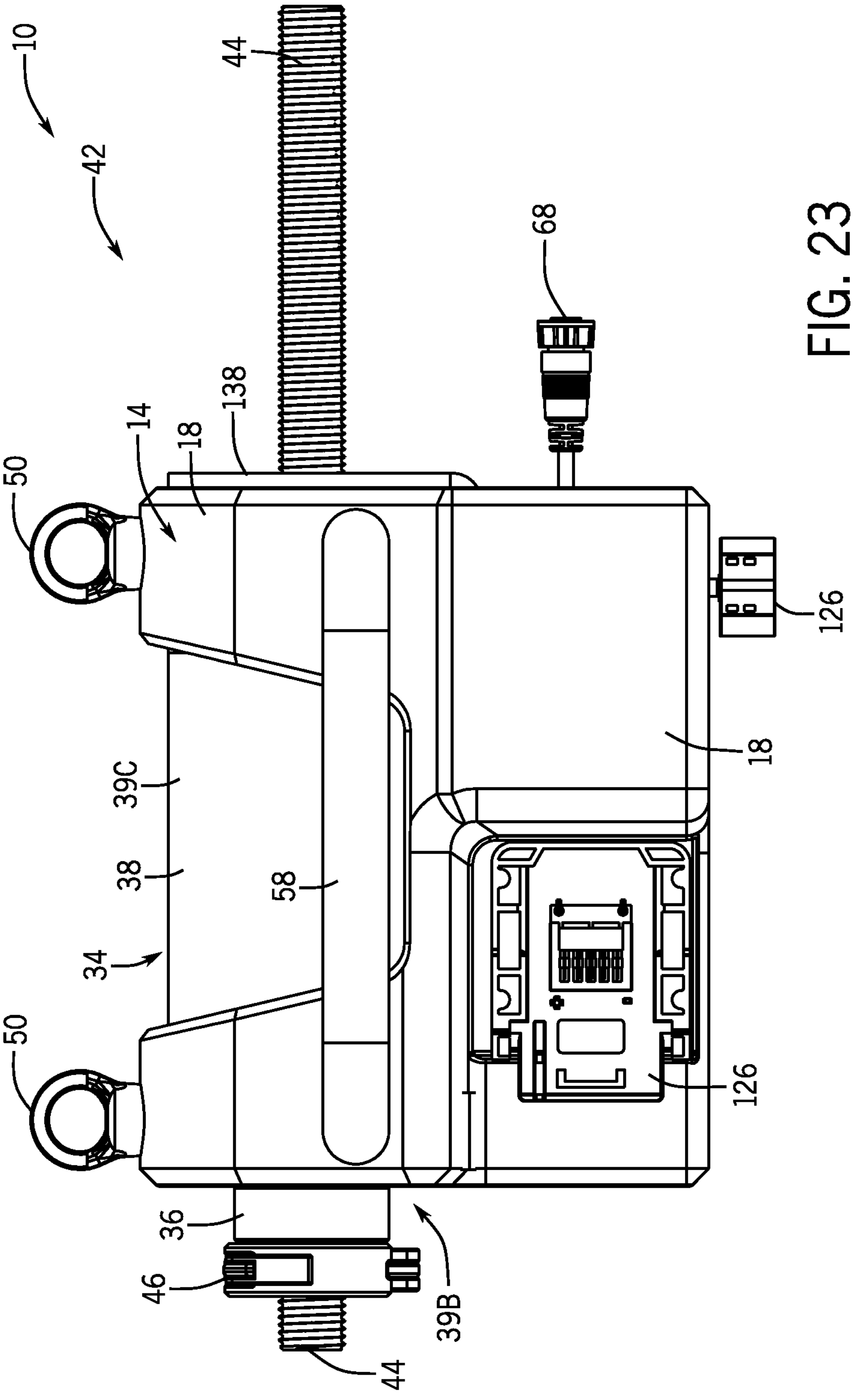
FIG. 23 is a right view of the pin puller of FIG. 21.

In the illustrated example of FIG. 9, the battery pack 30 is only partially received in the battery compartment 122 to allow for access to the battery pack 30. The direction in which the battery pack 30 is moved to engage and disengage with the battery compartment 122 define a battery axis B. In the example shown, the battery axis B is parallel to the second direction D2 and perpendicular to the first direction D1. In other examples (e.g., FIG. 20), the battery axis B is parallel to both the second direction D2 and the first direction D1.

Therefore, in certain examples, the piston axis P, the power unit axis M, and the battery axis B are all substantially parallel and the piston axis P lies in a first plane P1 with the battery pack 30 on one side and the motor 26 and the pump 22 on the other side of the first plane P1. The components on each side of the plane P1 are substantially balanced. The rigging points 50 lie on the plane P1 so that, when the cylinder assembly 10 is supported by a lifting device, the cylinder assembly 10 will be substantially balanced. In the example of FIG. 9, the power unit axis M and the battery axis B also lie in a second plane P2, which is perpendicular to the first plane P1 containing the piston axis P. In certain examples, the first plane P1 intersects the reservoir 110 (FIG. 8).

With continued reference to FIG. 9, in certain examples a bottom 31 of the battery pack 30 extends beyond the housing 18, which may improve access and handling for the user. However, the handle 58 extends farther away than the battery pack 30 in the third direction D3 from the sixth end 20F of the housing 18. As such, the handle 58 extends beyond the exposed bottom 31 of the battery pack 30 to thereby prevent the battery pack 30 from being impacted, such as if the pin puller assembly 42 were positioned with bottom 31 of the battery pack 30 facing downwardly towards the ground. In certain examples, the battery compartment 122 mechanically support the battery pack 30 on the housing 18 in one or more orientations (e.g., when oriented as a pin puller assembly 42 and/or when oriented as a hydraulic jack).

Figure 25:
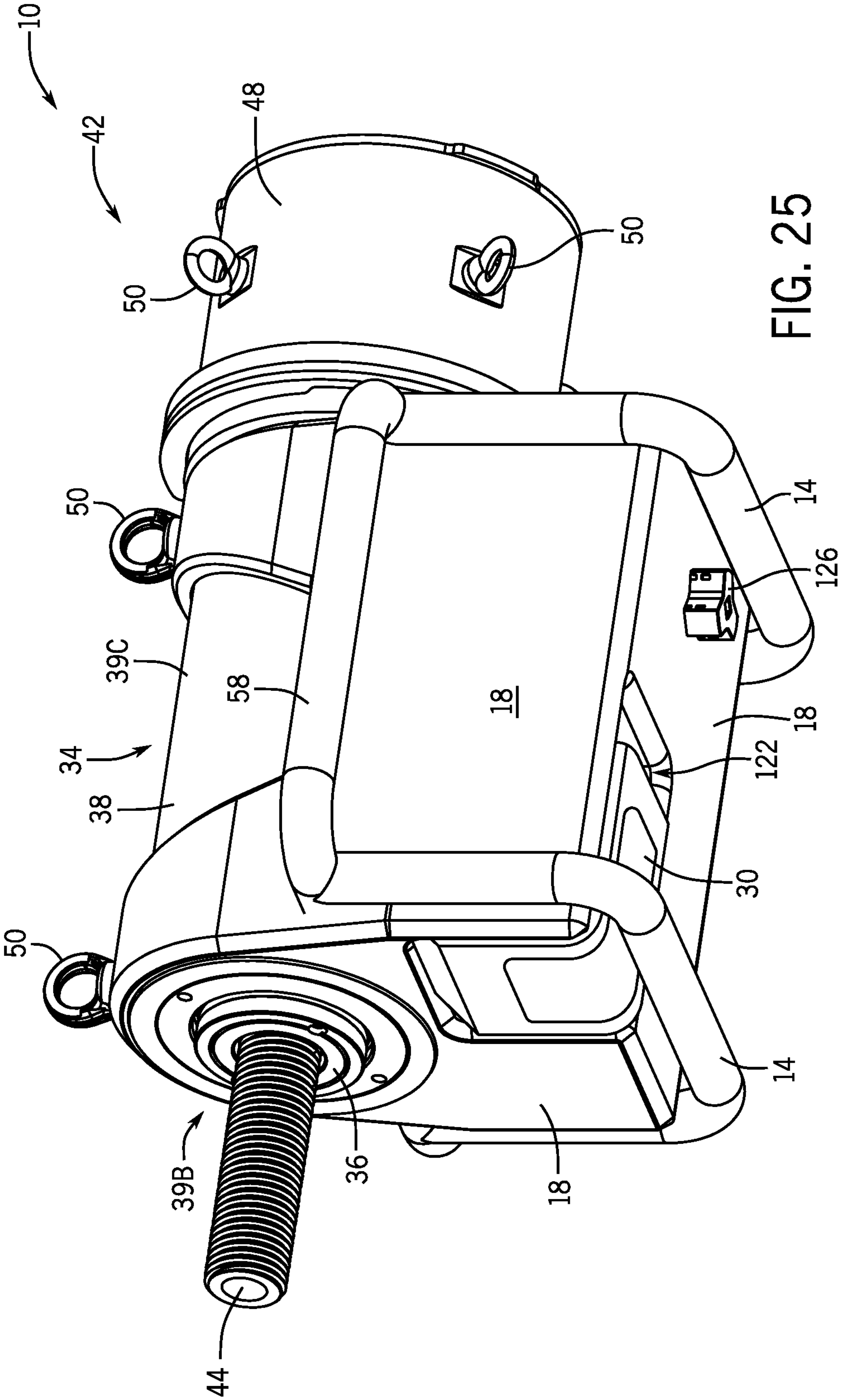
FIG. 25 is a right view of the pin puller assembly of FIG. 24.
Figure 26:
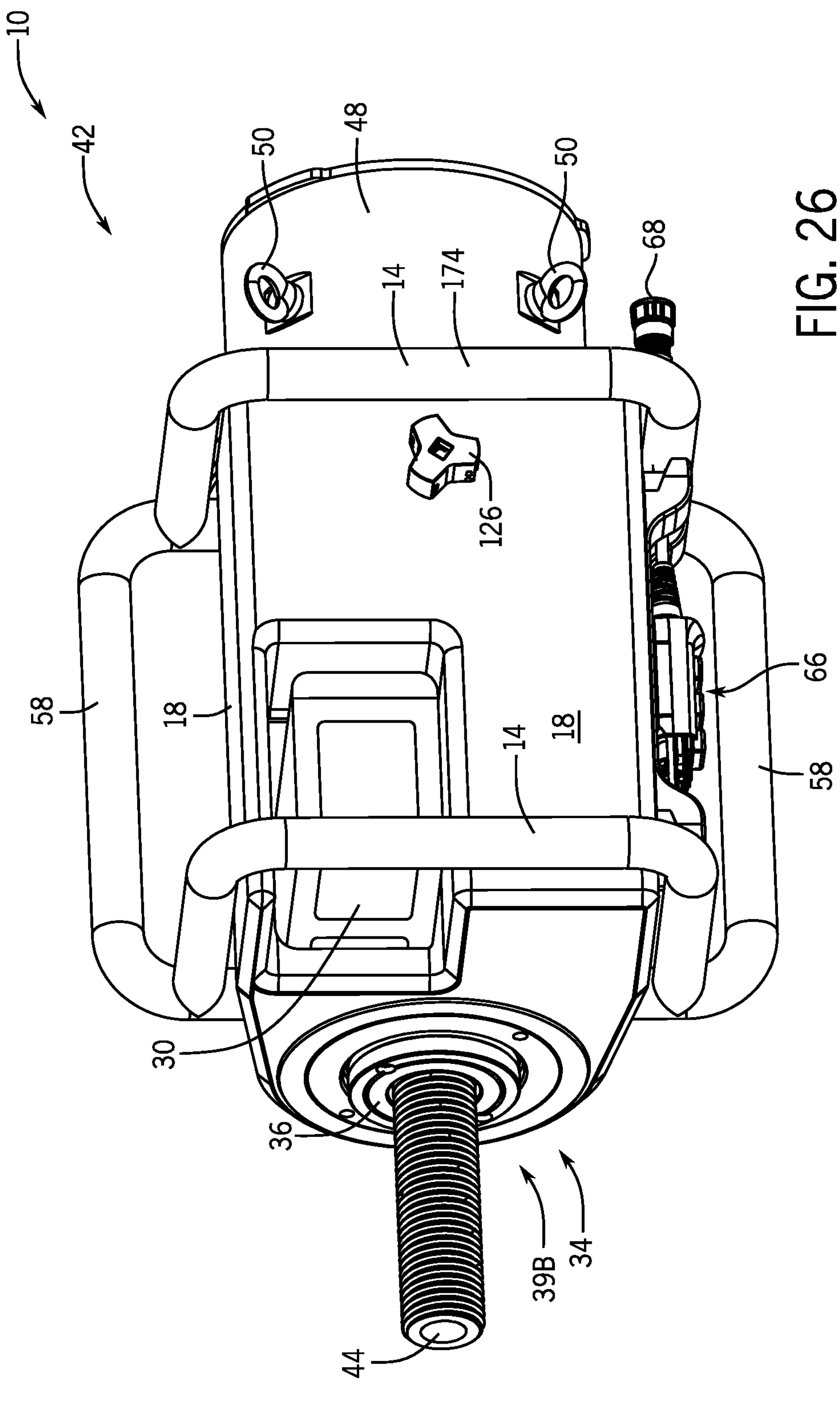
FIG. 26 is a bottom perspective view of the pin puller assembly of FIG. 24.
Figure 27:
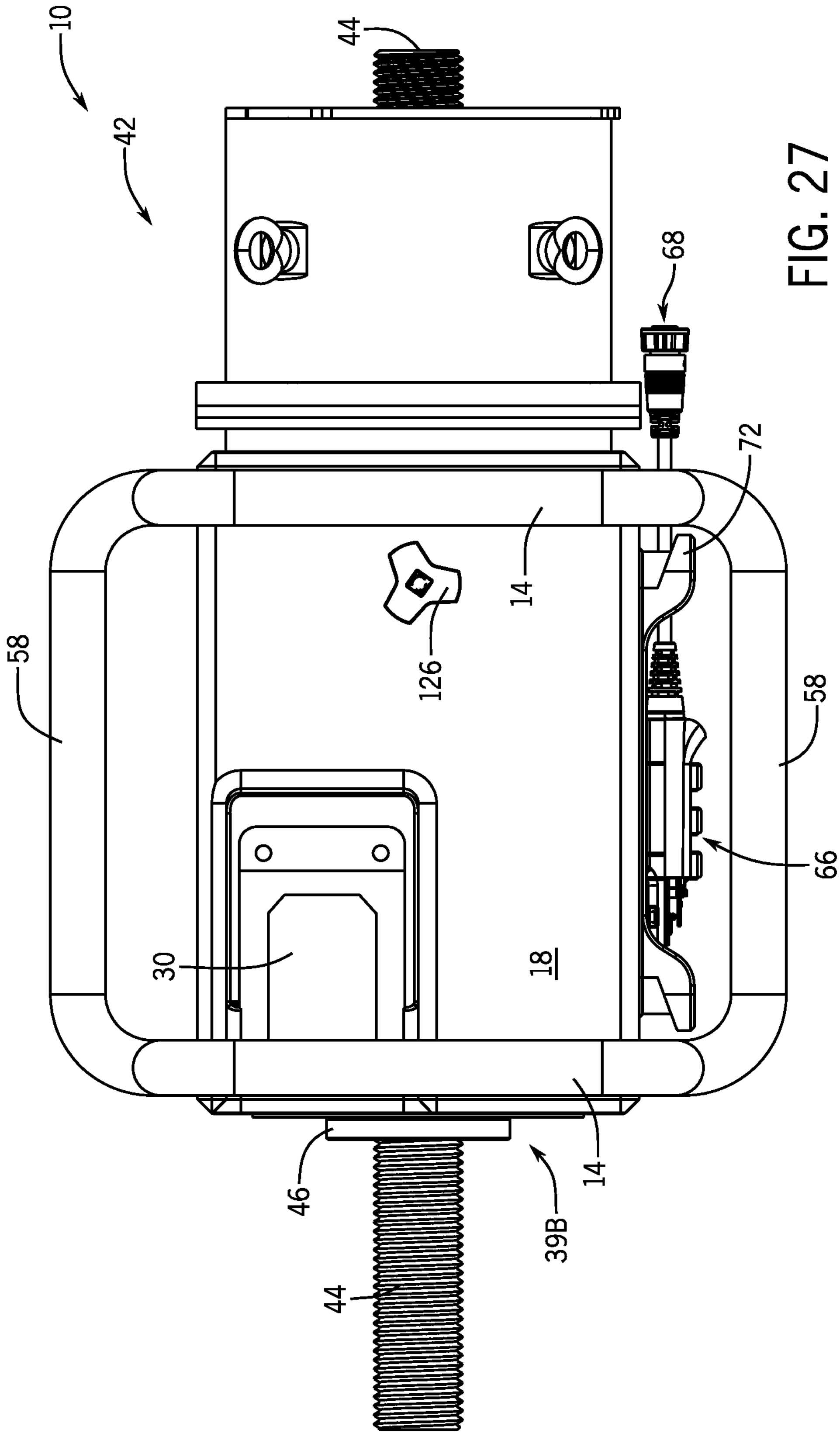
FIG. 27 is a bottom view of the pin puller assembly of FIG. 24.
Figure 28:
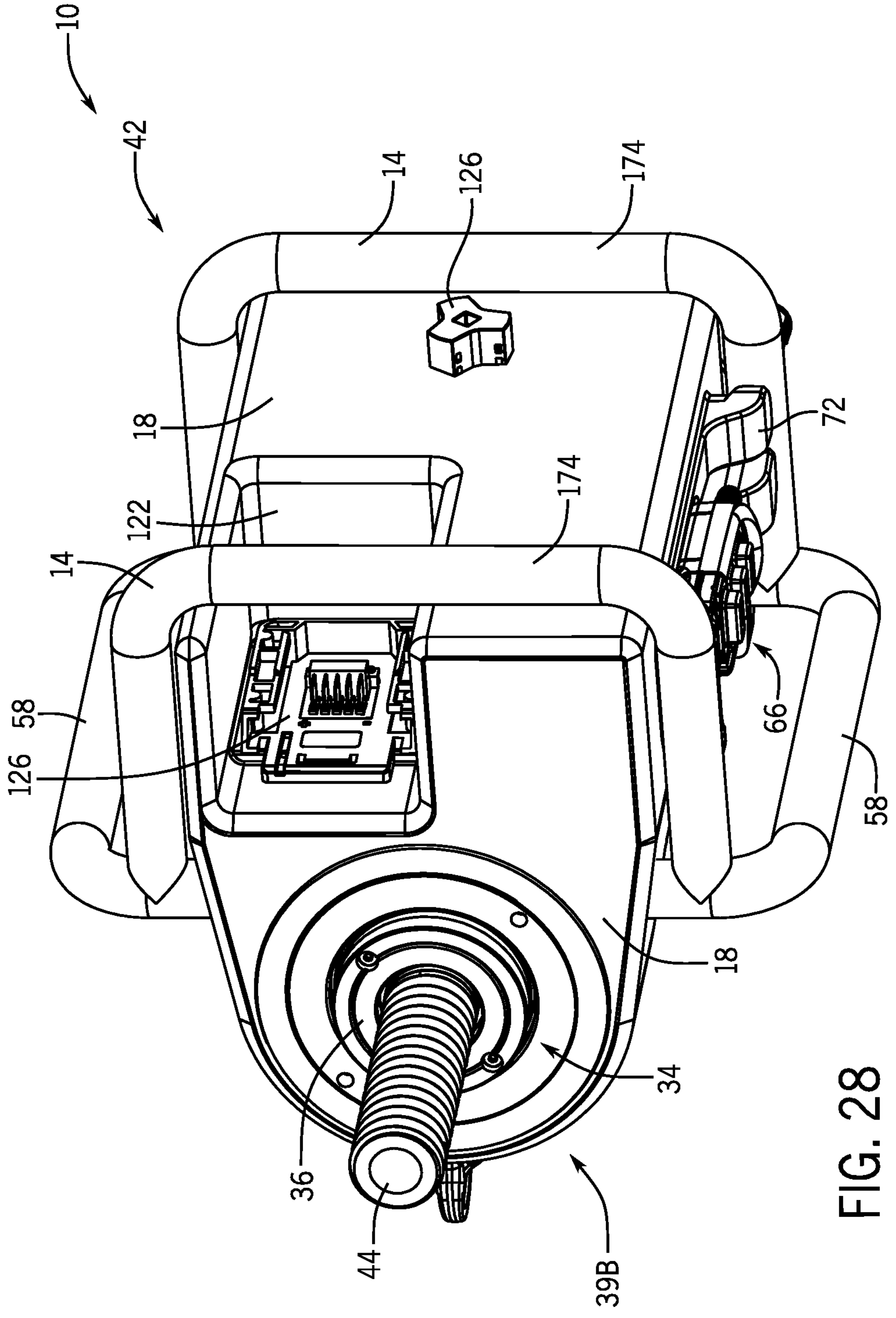
FIG. 28 is a bottom perspective view of the pin puller assembly of FIG. 24, illustrated with the battery pack removed.
Figure 29:
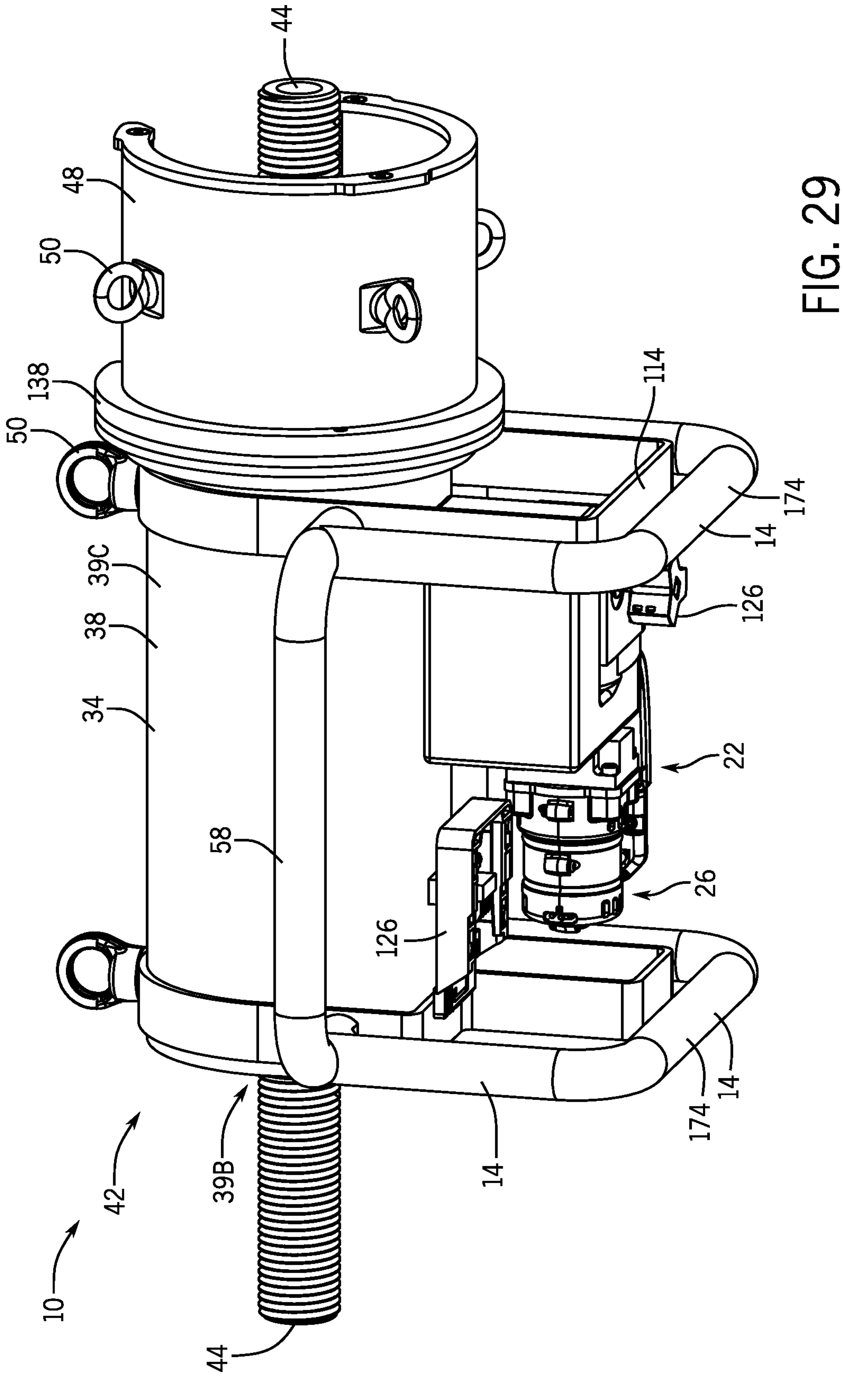
FIG. 29 is a right perspective view of the pin puller assembly of FIG. 24, illustrated with the housing of the cylinder assembly removed.
Figure 30:
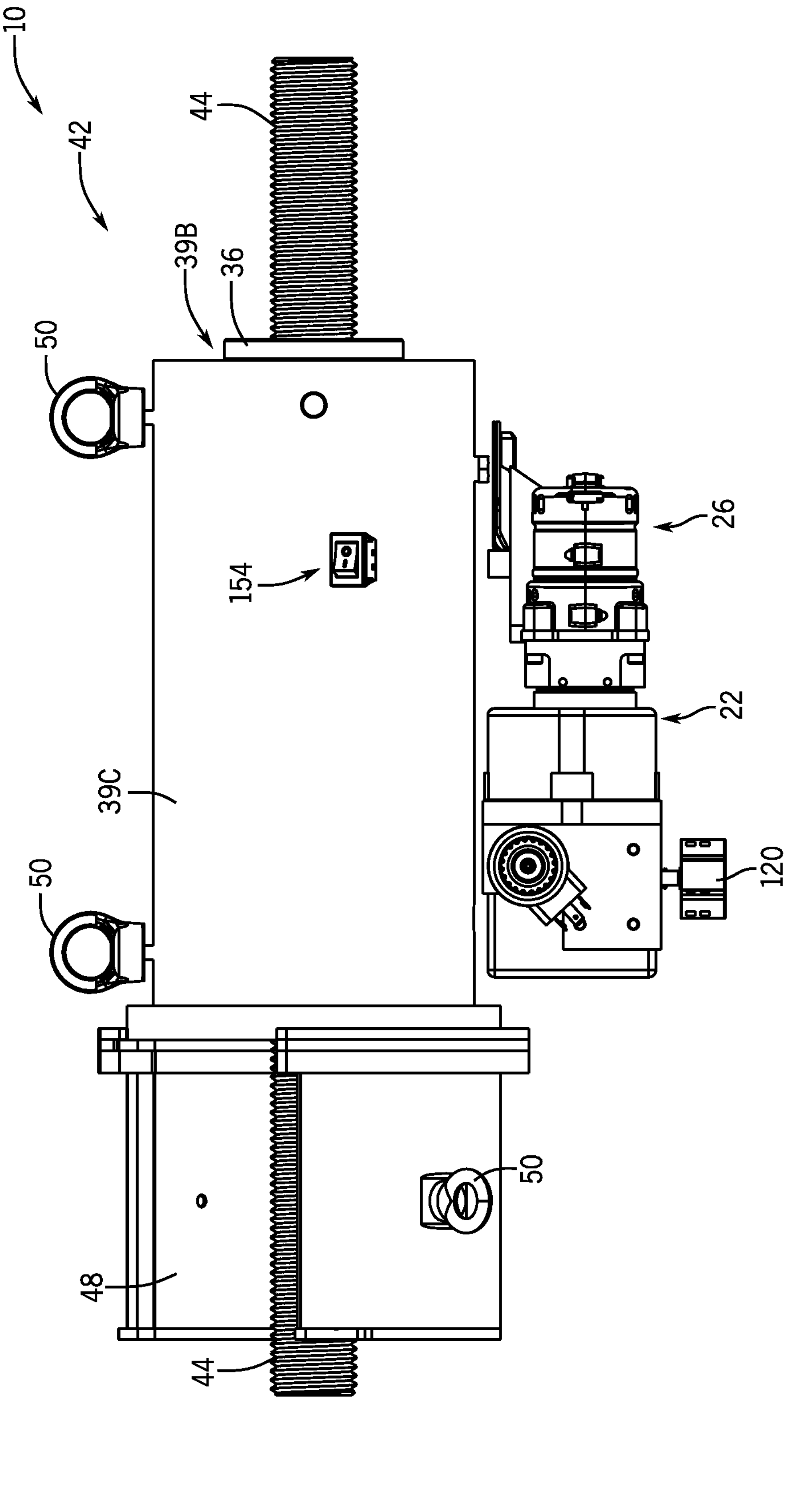
FIG. 30 is a left view of the pin puller assembly of FIG. 24, illustrated with the housing and the frame of the cylinder assembly removed.

In certain examples, the compartment 122 within the housing 18 provides that the battery pack 30 is partially enclosed on two sides (e.g., FIG. 9), on three sides (e.g., FIG. 25), on no sides (e.g., FIGS. 4, 5, and 35), or other configurations.

The battery pack 30 may be connectable and operable to power various different electric-powered devices, power tools (e.g., a hydraulic torque wrench, a hydraulic flange splitter, a driver, among others). The illustrated battery pack 30 is rechargeable and includes one or more battery cells arranged to provide a nominal voltage and capacity of the battery pack 30. For example, the battery pack 30 may be a 54-volt battery pack and may include fourteen (14) Lithium-ion (Li-ion) battery cells. In other constructions, the battery pack 30 may include fewer or more battery cells arranged to have a different nominal voltage or capacity. The battery cells may have a chemistry other than Li-ion for supplying the power to the motor 26 as DC power, such as, for example, Nickel Cadmium (NiCd), Nickel Metal-Hydride (NiMH), etc.

Referring to FIG. 6, the cylinder assembly 10 includes a control device such as a pendant 66 that is removably supported on the housing 18. The pendant 66 is in communication with a controller (not shown) for the cylinder assembly 10 (e.g., wirelessly or by a wire 67 or cable having a connector 68). The pendant 66 may be retained within a receptacle 70 in the housing 18 via a press fit arrangement therebetween. The wire 67 may be stored by wrapping around fingers 72 that extend from the housing 18 for coiling the wire 67 therearound while the pendant 66 is nested in the receptacle 70. In use, the wire 67 is unwrapped from the fingers 72 of the housing 18 and the connector 68 of the wire 67 is plugged into electronic engagement with a corresponding connector 74 in the housing 18 that is electrically connected to a controller and the motor 26 therein. The pendant 66 may be of a type presently known in the art, which includes buttons 167 for actuating the piston-cylinder unit 34 to move the piston 36 in either direction relative to the cylinder 38 and/or to stop movement thereof. An example of a commercially available pendant is model ZCP3 by Enerpac Tool Group Corp. Additional information regarding the pendant 66 is provided below.

A controller 78 (FIG. 3) is supported in the housing 18 and configured to control operation of the cylinder assembly 10 and its components. The controller may be of a type conventionally used within hydraulic jacks, including an electronic processor mounted on a printed circuit board (PCB, not separately shown). The controller is electrically and/or communicatively connected to a variety of modules or components of the cylinder assembly 10. The controller includes a plurality of electrical and electronic components that provide power, operational control, and protection to the components and modules within the controller and/or the cylinder assembly 10. For example, the controller includes, among other things, the electronic processor (a programmable electronic microprocessor, microcontroller, or similar device), a memory (not shown), and an input/output (I/O) interface (not shown). The electronic processor is communicatively coupled to the memory and the I/O interface.

The controller may be implemented in several independent controllers each configured to perform specific functions or sub-functions. Additionally, the controller may contain sub-modules that include additional electronic processors, memory, or application specific integrated circuits (ASICs) for handling communication functions, processing of signals, and application of the methods listed below. In other embodiments, the controller includes additional, fewer, or different components.

The memory is, for example, a non-transitory, machine-readable memory. The memory includes, for example, one or more non-transitory machine-readable media, a program storage area, and a data storage area. The program storage area and the data storage area can include combinations of different types of memory, such as read-only memory (ROM) and random access memory (RAM). In some embodiments, data is stored in a non-volatile random-access memory (NVRAM) of the memory. Various non-transitory computer readable media, for example, magnetic, optical, physical, or electronic memory may be used.

In the illustrated embodiment, the memory includes an input controller engine (e.g., software or a set of computer-readable instructions that determines functions to be executed in response to inputs) and cylinder assembly functions (e.g., software or a set of computer-readable instructions that provide functionality to the cylinder assembly 10).

The electronic processor is communicatively coupled to the memory and executes software instructions that are stored in the memory, or stored in another non-transitory computer readable medium such as another memory or a disc. The software may include one or more applications, program data, filters, rules, one or more program modules, and other executable instructions. In some embodiments, the memory stores predetermined functions, such as, for example, a calibration function (e.g., displaying options to a user and executing functionality to allow a user to calibrate the cylinder assembly 10) as well as other functions that are executed to provide cylinder assembly functionality, within the program storage area.

The I/O interface is communicatively coupled to components external to the controller and coordinates the communication of information between the electronic processor and other components of the cylinder assembly 10. In illustrated examples, information received from an input component, an external device, etc. is provided to the electronic processor to assist in determining functions to be executed and outputs to be provided. The determined functionality is executed with the electronic processor with the software located the memory.

Figure 16:
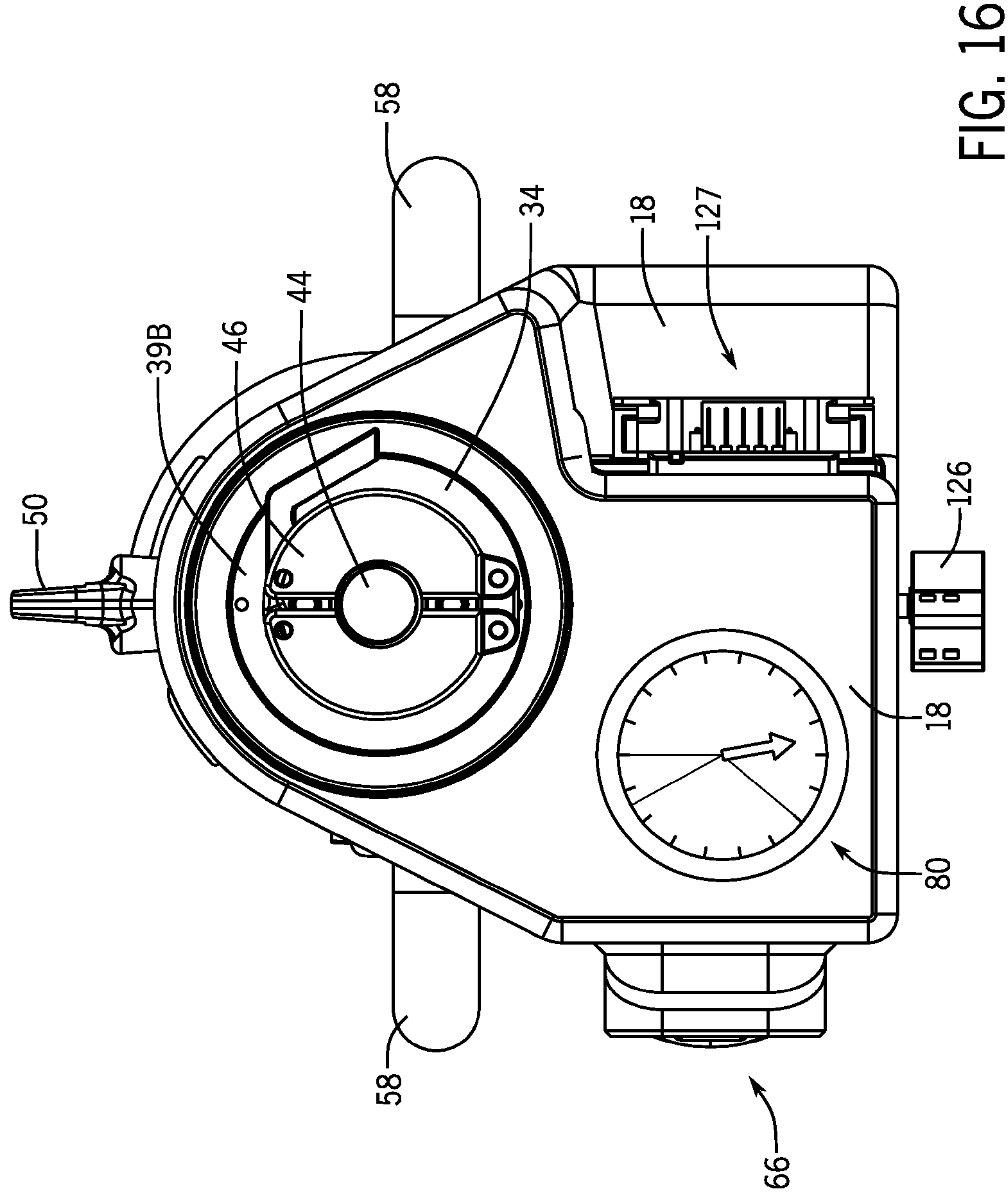
FIG. 16 is a rear view of a pin puller assembly similar to that of FIG. 9, including a pressure gauge.

The cylinder assembly 10 may include one or more sensors 80 (FIG. 3) operable to sense a characteristic of the cylinder assembly 10. For example, the sensors may include a stroke sensor (e.g., a wire stroke sensor), a fluid pressure gauge configured to measure a pressure of the hydraulic fluid (see FIG. 16), a tilt/movement sensor, a temperature sensor, etc. The controller is connected to and communicates with (e.g., receives measurement signals from) the sensor(s).

The illustrated cylinder assembly 10 of FIG. 6 includes an integrated user interface 155 positioned on the housing 18. In the illustrated construction, the integrated user interface 155 only allows the user to power on and off the cylinder assembly 10. The cylinder assembly 10 may be further controlled by a remote device (e.g., a pendant 66), as described below. Communication components are provided on the PCB and are configured to communicate with external devices such as an external control device such as a smart phone, a tablet, a computing device, and/or dedicated system control device/pendant 66, a data collection device, another cylinder assembly 10, a tool, and/or the like.

In illustrated constructions (see FIGS. 3-4), the cylinder assembly 10 includes a connector 76 that communicates via controller area network (CAN) bus to provide wired communication with a wired pendant 66. The pendant 66 is configured to control operation of the cylinder assembly 10 and/or a system of multiple cylinder assemblies 10. With the pendant 66, a user is able to be away from the pin puller assembly 42 for safety, convenience, or other advantages.

The pendant 66 includes a user input device (e.g., one or more buttons 167, keys, a touch screen, etc.) configured to receive one or more inputs (e.g., a selection, a command, etc.) from a user. The inputs are communicated to the controller to execute selected cylinder assembly functions and/or operations. For example, the user input device may include a power button, a "pair" button for use in wirelessly connecting the cylinder assembly 10 to an external device, a "select" button, etc. The user input device may also provide integrated controls for the piston-cylinder unit 34 (e.g., an "advance" button to advance the piston 36, a "retract" button to retract the piston 36, etc.) and controls for a work light (e.g., an illumination device, not shown).

The pendant 66 may include a user feedback or output device (not shown) configured to display conditions or data associated with the cylinder assembly 10. The controller communicates with and controls the output to the user, such as condition(s) presented on the display. For example, the display may be configured to display, in real-time or substantially real-time, a fluid pressure, the position of the piston 36 relative to the cylinder 38 (stroke length), the load, the speed, the capacity of the battery pack 30, etc.

The display may include, for example, a liquid crystal display ("LCD"), a light-emitting diode ("LED") display, an organic LED ("OLED") display, an electroluminescent display ("ELD"), a surface-conduction electronemitter display ("SED"), a field emission display ("FED"), a thin-film transistor ("TFT") LCD, etc. Alternatively or additionally, the output device may provide other types of output—audible, tactile, etc. A port (not shown; e.g., universal serial bus (USB), Ethernet, serial advanced technology attachment (SATA), integrated drive electronics (IDE), etc.) may be provided for connection, communication (e.g., data recording, transfer, etc.) and/or power supply (e.g., to charge the battery pack 30, to power electronic components of the cylinder assembly 10, etc.).

Multiple cylinder assemblies 10 may be used simultaneously in a single operation (e.g., to lift a large object (a house, a piece of machinery, etc.). For this operation, the cylinder assemblies 10 may be controlled wirelessly and include communication components with at least a wireless transceiver (not shown) configured to transmit and receive signals wirelessly with one or more external devices (e.g., a wireless control device) using for example, Wi-Fi, Bluetooth, cellular networks, telematic networks, etc. The transceiver communicates with (e.g., receives signals from and transmits signals to) the controller. For example, the controller outputs signals representative of measured values (e.g., position, pressure, tilt, movement, etc.) from the sensor(s) to the transceiver for communication externally from the cylinder assembly 10 (e.g., to the wireless control device) The cylinder assembly 10 may provide intelligent communication between cylinder assemblies 10 coordinated and synchronous lifting.

The cylinder assembly 10 may be constructed to provide different tonnage/load capacities, stroke length, etc. By way of example, the cylinder assembly 10 may provide a tonnage capacity of about 30 Tons (T), about 60 T, or other capacities. The components of each cylinder assembly 10 are therefore constructed to provide the required characteristics to support this tonnage. Because each cylinder assembly 10 includes a self-contained power unit, the components of the cylinder assembly 10 (e.g., the pump 22, the motor 26, the reservoir 110, the valve block 114, etc.) may be optimized (e.g., capacity, size, etc.) for use with the piston-cylinder unit 34 and/or to the requirements of the cylinder assembly 10.

Additional configurations, positions, and/or quantities of handles 58, frame members 98, fingers 72 for wrapping the wire of a pendant 66, housings 18, rigging points 50, and other components are also contemplated by the present disclosure and shown in the figures. For example, the illustrated configuration of FIGS. 9-23 show two handles 58 that are disposed on opposite sides of the housing 18 to provide a T-handle shape. As shown in FIG. 17, the handles 58 are connected to the frame members 98 to act as a roll cage (e.g., a protective bar) around portions of the housing 18 and may, for example, protect components of the cylinder assembly 10 from damage (e.g., in the case of an impact). In the illustrated construction, handles 58 extend around a portion of the housing 18 and over components of the cylinder assembly 10 (e.g., the pump 22, the motor 26, the reservoir 110, the valve assembly 118, etc.) thereby partially protecting the components.

Figure 35:
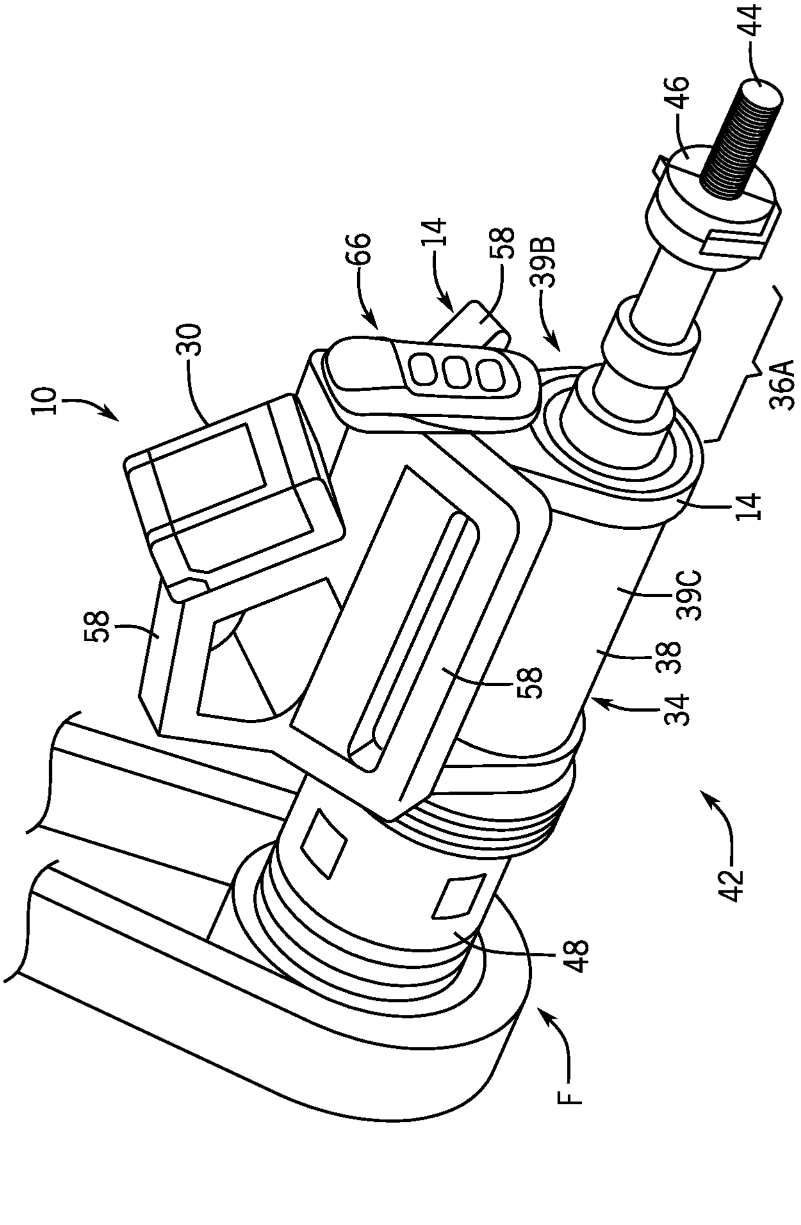
FIG. 35 is a left perspective view of another cylinder assembly configured for operation as a pin puller assembly according to the present disclosure, illustrated with a telescoping piston.

In another example, shown in FIG. 35, the cylinder assembly 10 has a center handle 58 on which the battery pack 30 is supportable along with two side handles 58 extending along the piston-cylinder unit 34. The example shown in FIG. 35 further includes a telescoping piston 36A as the piston. One example of a telescoping piston available in the market is model RT1510 by Enerpac Tool Group Corp. The telescoping piston provides for increased stroke for pulling pins, which reduces the number of column members 48 needed for removing pins via the pin puller assembly 42.

The illustrated configuration of FIGS. 9-23 further provides for lifting or rigging points 50 that are connected to the frame 14, which project from the housing 18. The interface 127 for the battery pack 30 is provided below the piston-cylinder unit 34 and to one side of the cylinder assembly 10 (e.g., when the cylinder assembly 10 is suspended via the rigging points 50). The pendant 66 is supported on the opposite side of the housing 18 as compared to the controller for the cylinder assembly 10 and has a wired connection. As shown in FIG. 17, the example further illustrates that in certain configurations the frame 14 includes one or more frame members (two shown) connected to and supporting components of the cylinder assembly 10. Further, each frame member 98 has a curved portion 102 extending around the piston-cylinder unit 34 and an opposite flat base portion 106. The pump 22 and the motor 26 are supported within the periphery of the frame members 98. The flat portions provide a rigid base when supporting the cylinder assembly 10 on a support surface (e.g., a ground surface).

As mentioned above, in certain examples the power unit (e.g., the pump 22 and the motor 26) along with the reservoir 110 and the valve block 114 are connected to and supported on the frame 14 (e.g., on the frame member 98). More specifically, the valve block 114 is fixed directly to the frame member 98, the pump 22 and the reservoir 110 are fixed to the valve block 114, and the motor 26 is supported on the pump 22. The frame 14 thus supports the weight of the components of the cylinder assembly 10.

As also mentioned above, in certain examples one or more handles 58 are connected to two or more frame members 98. When the cylinder assembly 10 is supported by the handles 58 (e.g., by one or more operators), the frame 14 supports the components of the cylinder assembly 10. A rigging point 50 is also directly connected to at least one of the two or more frame members 98. When the cylinder assembly 10 is supported by the rigging points 50 (e.g., on a lifting device), the frame 14 supports the components of the cylinder assembly 10.

Certain aspects of alternative configurations are shown in FIGS. 24-31, which show the cylinder assembly 10 included within a pin puller assembly 42. These aspects include two handles 58 are disposed on opposite sides of the housing 18 to provide a T-handle shape. The handles 58 are connected to the frame members 98. The cylinder assembly 10 includes additional bars 174 connected to the handles 58 and extending around the housing 18 (e.g., around the lower sides and the bottom of the housing 18). The handles 58 and the bars 174 act as a roll cage (e.g., a protective bar) around portions of the housing 18 and may, for example, protect components of the cylinder assembly 10 from damage (e.g., in the case of an impact). In the illustrated construction, handles 58 and bars 174 extend around a portion of the housing 18 and over components of the cylinder assembly 10 (e.g., the pump 22, the motor 26, the battery pack 30, the reservoir 110, the valve assembly 118, etc.) thereby partially protecting the components.

Figure 31:
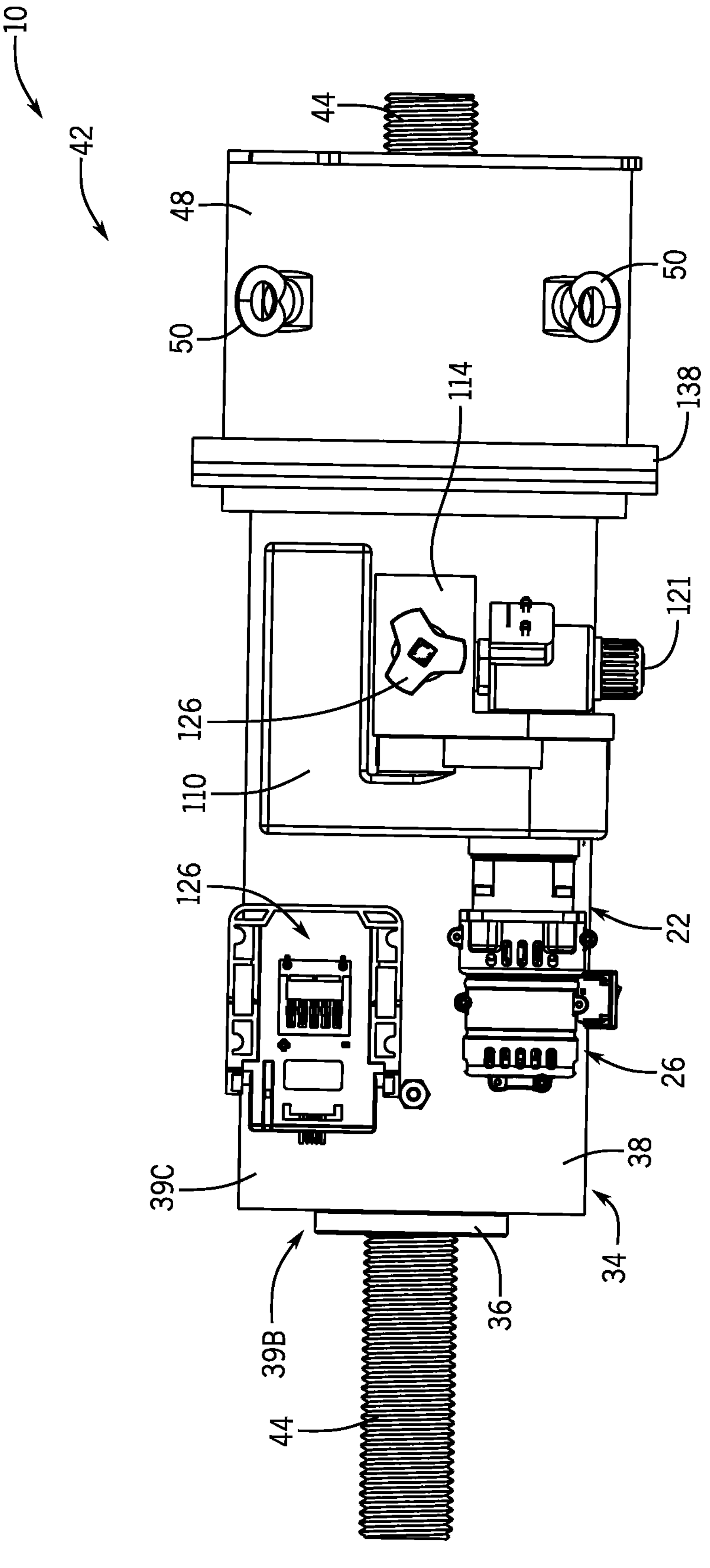
FIG. 31 is a bottom view of the pin puller assembly shown in FIG. 30.

As is further illustrated in FIG. 31, rather than extending around the pump 22 and the motor 26 (as in other cylinder assemblies 10 discussed herein), the reservoir 110 extends in the opposite direction and extends around the valve block 114. The position of the reservoir 110 may better balance the weight of the cylinder assembly 10.

Figure 32:
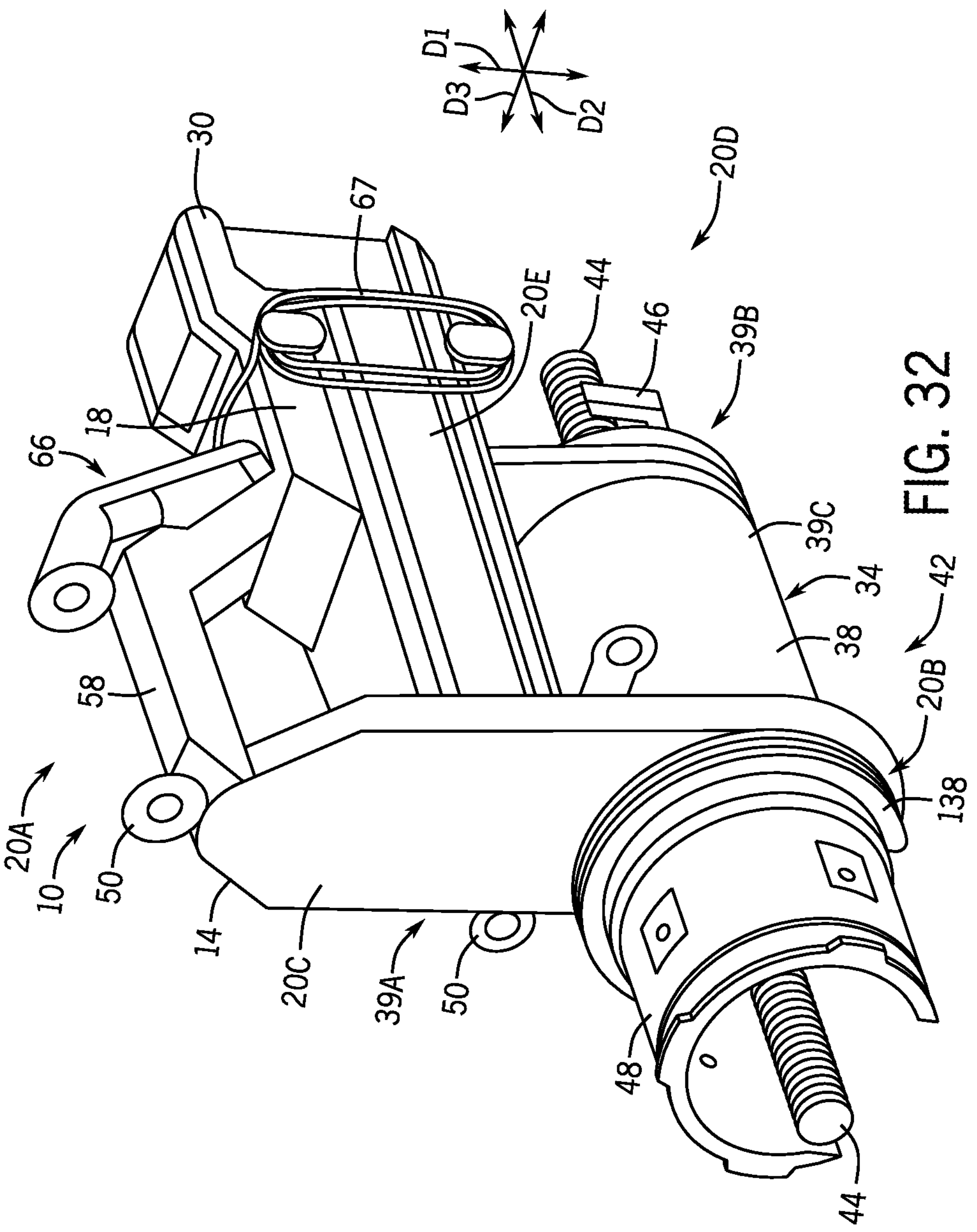
FIG. 32 is a front perspective view of another example of a cylinder assembly configured for operation as a pin puller assembly according to the present disclosure.
Figure 33:
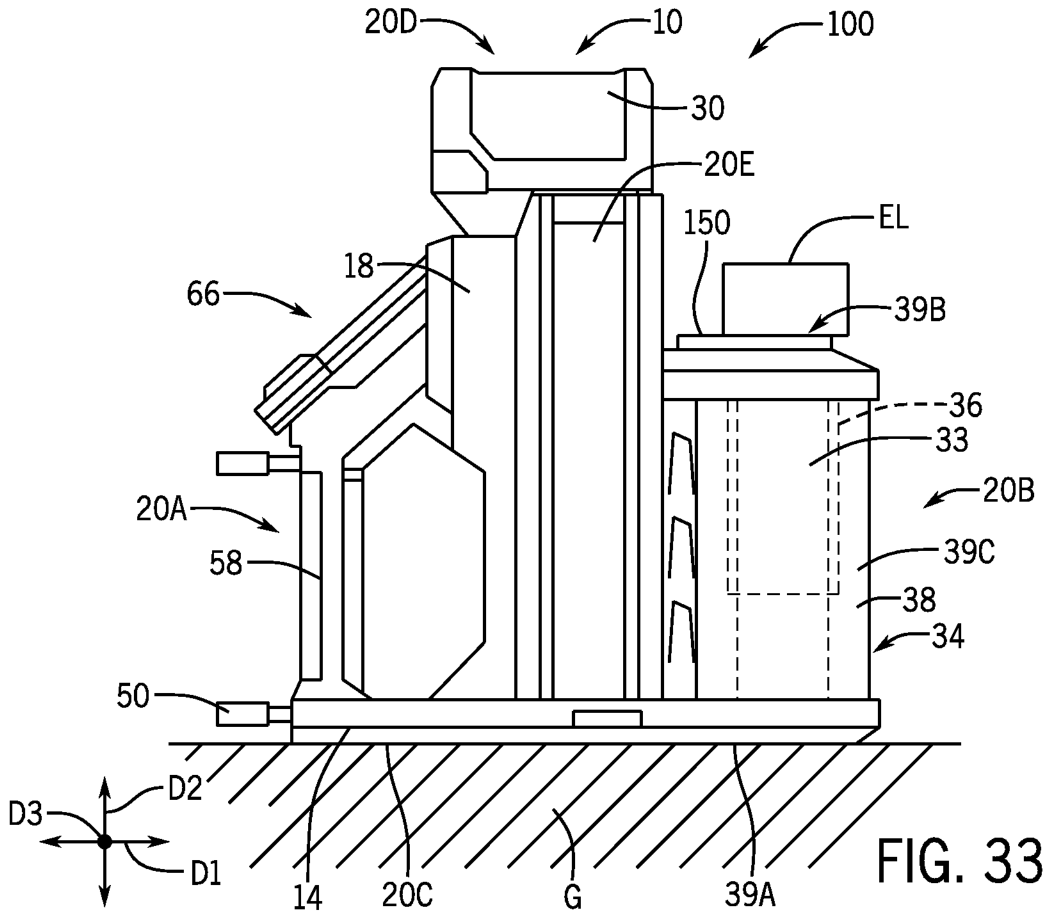
FIG. 33 is a left view of the cylinder assembly shown in FIG. 32, illustrated configured for operation as a hydraulic jack assembly according to the present disclosure.

As discussed above, the cylinder assembly 10 is advantageously configured to be useable in multiple applications, or within multiple tools. FIG. 32 shows one example of a cylinder assembly 10 incorporated within a pin puller assembly 42, similar to other pin puller assemblies 42 discussed above. FIG. 33 shows the same cylinder assembly 10, now configured for use as a hydraulic jack assembly 100. As discussed above, the cylinder assembly 10 extends in a first direction D1 between a first end 20A and a second end 20B, in a second direction D2 between a third end 20C and a fourth end 20D, and in a third direction D3 between a fifth end 20E and a sixth side (not labeled). The first direction D1 is perpendicular to the second direction D2, which are each perpendicular to the third direction D3. When used within a pin puller assembly 42, the frame 14 is typically orientated such that the direction D1 extends vertically with the cylinder assembly 10 being supported overhead via the rigging points 50. In other words, the second end 20B of the cylinder assembly 10 faces downwardly toward the ground but is typically suspended above the ground.

In contrast, when used as the hydraulic jack assembly 100 of FIG. 33, the column member 48 is not attached to the attachment plate 138 at the first end 39A of the cylinder 38. In certain embodiments (discussed further below), a base plate 170 is attached to the attachment plate 138, here via a twist-lock in the same manner as the column member 48 discussed above. This then allows the frame 14 to be rotated 90 degrees versus the orientation of FIG. 32 such that the frame 14 (and in some cases a base plate 170) supports the cylinder assembly 10 with the third end 20C thereof facing or resting on the ground. In this manner, the frame 14 not only provides support and protection for the cylinder assembly 10, but also functions as a stable base for the cylinder assembly 10 while lifting external loads as the hydraulic jack assembly 100.

In the example of FIG. 33, a lift plate 150 is positionable on the piston 36, whereby the lift plate 150 is configured to support the external load to be lifted when the piston 36 is extended toward its advanced position within the cylinder 38. In certain examples the lift plate 150 is removably positioned on the piston, for example having a stem that is at least partially received within the passage 33 in the piston 36 to be radially retained thereon in use. In this manner, operating the cylinder assembly 10 lifts the external load EL vertically away from the support surface (e.g., ground plane G). The lift plate 150 may be of a type presently available in the market, such as the 18348 Cylinder Load Cap produced by Enerpac Tool Group Corp.

Figure 34:
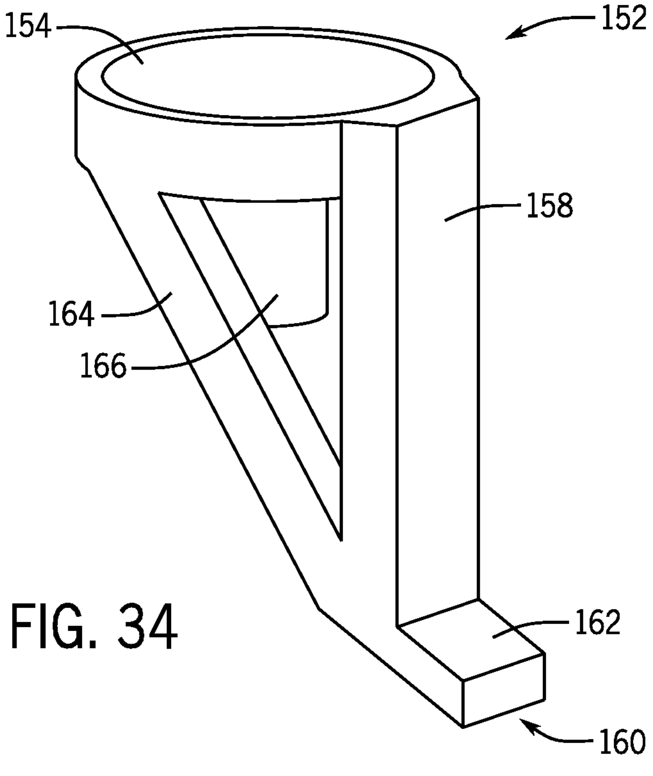
FIG. 34 is a perspective view of a toe jack insert configured for use with the cylinder assembly of FIG. 33.

The cylinder assembly 10 of FIG. 33 is also configured to replace the lift plate 150 provided on the piston 36 with other components for use as a hydraulic jack assembly 100. FIG. 34 illustrates another base plate that is also configured to be positioned proximate the piston, now a toe jack insert 152. The toe jack insert 152 has an upper plate 154 similar to that of the lift plate 150 shown in FIG. 33, which is configured to contact the external load EL to be lifted (e.g., a machine, a car frame, and/or the like). The upper plate 154 is shown to have a circular shape but may vary depending on the application and external load to be lifted. The upper plate 154 is presently shown to be substantially flat but may alternatively have grooves or different mating features for securely contacting the external load to be lifted. A cylindrically shaped stem 166 extends perpendicularly downwardly from the upper plate 154 and is configured to be received within the passage 33 through the piston 36 in the same manner as the stem of the lift plate 150 of FIG. 33.

Also extending perpendicularly downwardly from the upper plate 154 is leg member 158. The leg member 158 is radially displaced from a center of the upper plate 154 such that the leg member 158 extends downwardly adjacent to the cylinder 38 when the toe jack insert 112 is installed within the cylinder assembly 10. In other words, the leg member 158 is positioned such that the cylinder 38 does not interfere with the upper plate 154 resting on the end of the piston 36. It should be recognized that this therefore allows the piston 36 to be moved across its full range within the cylinder 38 without interference at any position. In the illustrated example, a support member extends from another position on the periphery of the upper plate 154 to the bottom of the leg member 158 for additional support in use.

At the bottom of the leg member 158 is a toe 160 extending perpendicularly therefrom. An upper surface 162 of the toe 160 is configured to contact an external load to be lifted (e.g., a vehicle), once again being lifted by actuation of the piston 36 in a manner conventional with toe jacks. It should be recognized that the term contact shall be read to include any manner of support for the external load, even if this contact is indirect. A support member 164 is also provided between the upper plate 154 and the leg member 158 and/or toe 160, which helps provide rigidity and strength for the leg member 158 and the toe 160 in use. In certain examples, two support members 164 are provided, which straddle the cylinder 38 when the toe jack insert 152 is positioned on the piston 36. This provides for further immobilization of the toe jack insert 152 in use, keeping the stem 166 centered about the piston 36. The toe jack insert may be similar to those presently available in the market, such as the toe jack attachment used with bottle jack model TJH2A produced by Enerpac Tool Group Corp., or the toe jack used with a removable cylinder sold as model SOH106 by Enerpac Tool Group. Corp.

Figure 36:
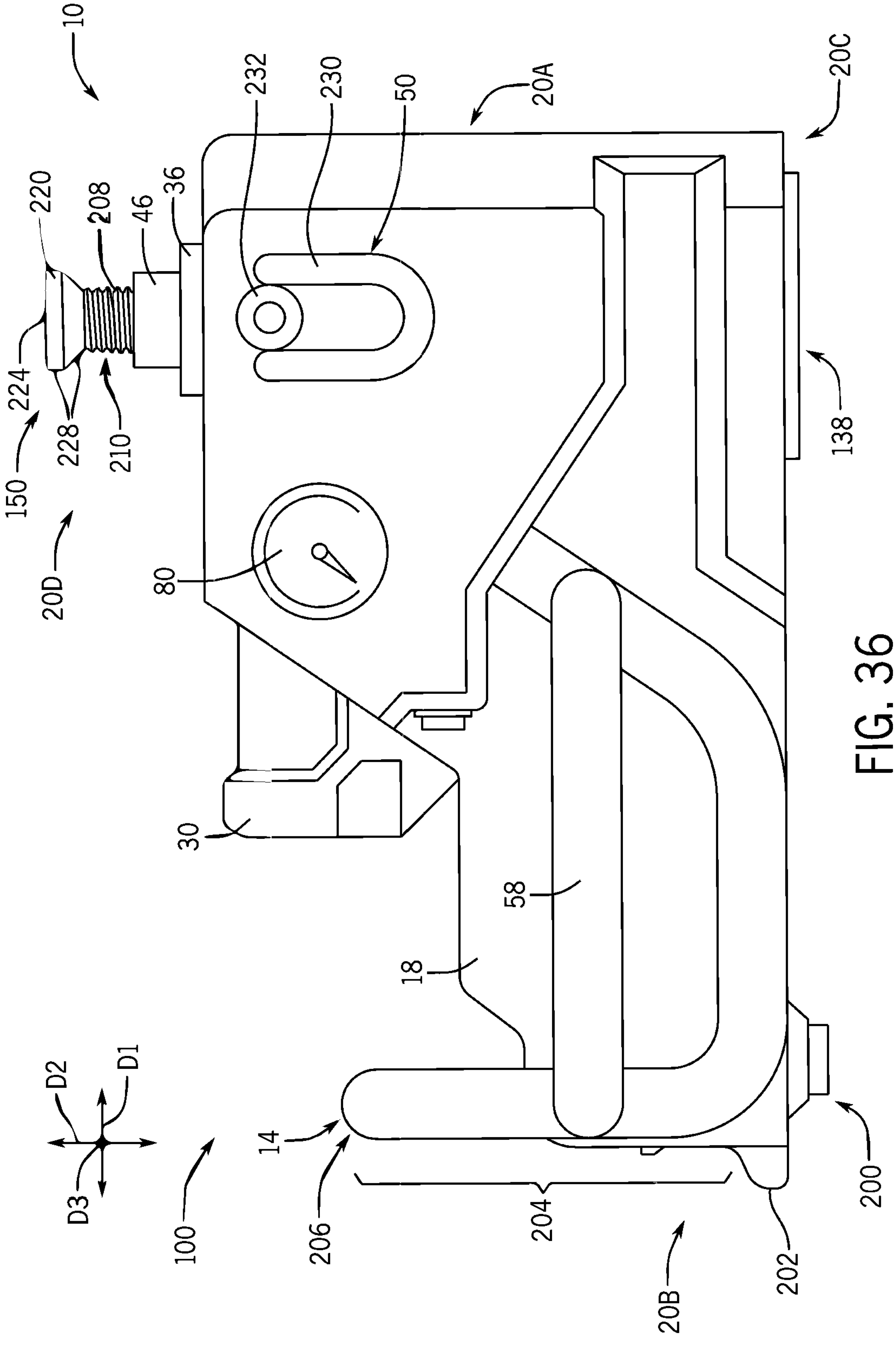
FIG. 36 is a right view of another cylinder assembly configured for operation as a hydraulic jack assembly according to the present disclosure.
Figure 37:
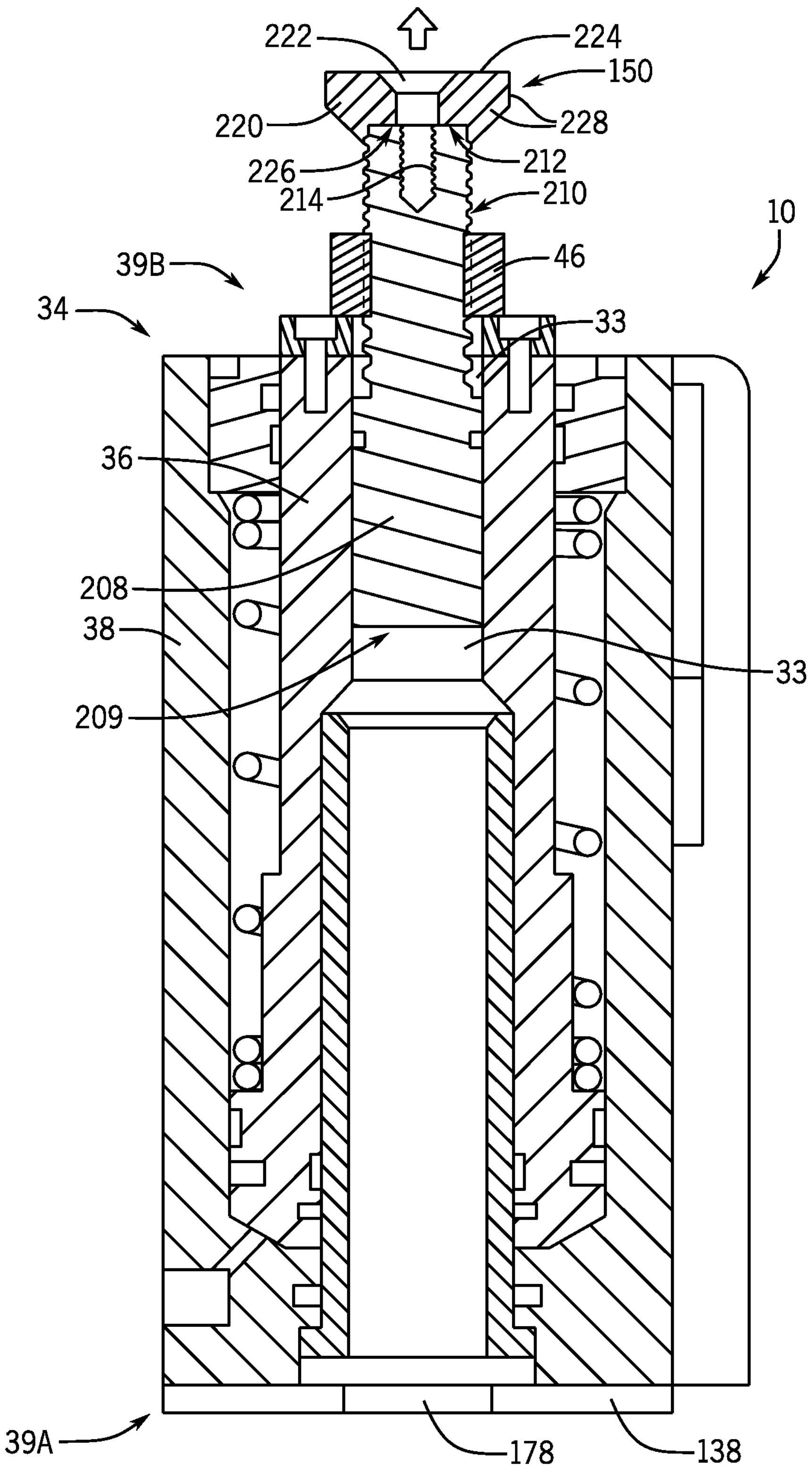
FIG. 37 is a sectional view through the piston-cylinder unit of the cylinder assembly of FIG. 36.

FIGS. 36-38 depict aspects of another embodiment of a cylinder system 10 arranged for use as a hydraulic jack assembly 100. The housing 18 includes a foot 200 having a height that provides for the hydraulic jack assembly 100 being level when an optional base plate 170 (see FIG. 38) is coupled to the attachment plate 138, such as via a twist-lock as discussed above, and the cylinder assembly 10 is positioned for use as a hydraulic jack assembly 100. The housing 18 also includes a foot 202 that extends the width of the housing 18 in the second direction D2. The foot 202 is configured to rest on the ground when the cylinder assembly 10 is oriented 90 degrees from that shown in FIG. 36, such as for use as a pin puller assembly 42 (see FIG. 1).

The frame 14 is configured to provide multiple separate functions, some of which are similar to those described above. These includes handles 58 that extend on opposing sides of the housing 18 for lifting and/or positioning the cylinder assembly 10 in use. The handles 58 extending outwardly form the housing 18 (e.g., in the third direction D3) also protect the housing 18 from contact on the sides thereof, including if the cylinder assembly 10 is accidentally tipped.

It should be recognized that part of the frame 14 is exposed from the outside of the housing 18, whereas other portions extend inside the housing 18. While the interior portions of the frame 18 do not protect the exterior of the housing 18 from contact, they nonetheless provide protection for interior components and a structure for coupling components thereto (e.g., the pump 22, the motor 26, and the power source (e.g., a battery pack 30), and the piston-cylinder unit 34 (see FIG. 1).

Another portion of the frame 14 functions as a standing frame 204 when the cylinder assembly 10 is oriented with the first end 20A facing upwardly (see e.g., FIG. 1). In this case, the frame 14 is configured such that at least a first end 206 of the standing frame 204 rests upon the ground to stably support the cylinder assembly 10 in this position. Essentially, the cylinder assembly 10 is supported by the standing frame 204 and the foot 202 discussed above. By way of example, the cylinder assembly 10 may be positioned in this manner before lifting upwardly for use as a pin puller assembly 42.

The cylinder assembly 10 of FIGS. 36 and 37 further illustrates another type of lift plate 150 for lifting an external load when configured as a hydraulic jack assembly 100. In particular, the lift plate 150 includes a stem 208 that is generally cylindrically shaped and extends from a first end 209 to a second end 212. The outer diameter of the stem 208 has threads 210 along at least a portion thereof, particularly proximate the second end 212. The threads 210 are configured to threadingly engage with a reaction member 46. The threads 210 may be the same as those extending along a length of a pull rod, which allows the same reaction member 46 to be used for either pin pulling in a pin puller assembly 42 (FIG. 1) or lifting in the hydraulic jack assembly 100. The distance between the second end 212 of the stem 208 and the second end 39B of the cylinder 38 in the second distance D2 is adjustable by changing the position in which the reaction member 46 is threaded along the length of the stem 208. This allows the user to adjust the height of the lift plate 150 relative to the external load to be lifted before operating the cylinder assembly 10, providing flexibility.

The stem 208 also has an opening 214 extending inwardly from the second end 212, which is internally threaded. A saddle 220 is positionable on the second end 212 of the stem 208 and coupled to the stem 208 via a fastener 222 (e.g., a screw or bolt) that extends through the saddle 220 and into threaded engagement with the opening 214 in the stem 208. The illustrated saddle 220 is frustoconically shaped, have a top 224, an opposite bottom 226, and sides 228 extending therebetween. The bottom 226 is recessed inwardly (i.e., towards the top 224) to center and retain the saddle 220 atop the second end 212 of the stem 208. This configuration provides that any lateral forces between the saddle 220 and the stem 208 are opposed by the saddle 220 rather than creating a shear force on the fastener 222 coupling the saddle 220 to the stem 208.

This configuration of stem 208 and saddle 220 allows for simply replacement of different types of saddles as needed. In particular, while a saddle 220 with a flat top 224 is show, other configurations are contemplated, such as having a U-shaped or V-shaped top depending on the shape of the external load to be lifted thereby.

It should be recognized that other configurations are also contemplated by the present disclosure, including those in which the saddle 220 is not separable from the stem 208. It should further be recognized that, due to the flexible nature of the stem 208 and its engagement with the cylinder 38 and reaction member 46, different stem/saddle combinations are easily replaced within the cylinder assembly 10 as needed.

The illustrated cylinder assembly of FIG. 36 also shows an alternate type of rigging point 50. In this case, the rigging points 50 are conventional, pivotable anchors with loops 230 pivotably coupled to bolts 232 that are threaded into the frame 14 and/or housing 18 of the cylinder assembly 10. It should be recognized that these rigging points 50 are useable for lifting the cylinder assembly 10 in the orientation of FIG. 36, the orientation of FIG. 1, or other orientations.

In this manner, the presently disclosure provides for a cylinder assembly 10 that is easily configurable in either a pin pulling arrangement or a lifting arrangement, such as by swapping a column member 48 for a base plate 170 and inserting a lifting plate 50 as appropriate.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A cylinder assembly comprising:
- a housing;
- a pump supported within the housing;
- a motor supported within the housing and operable to power the pump;
- a power source supported by the housing and operable to supply power to the motor;
- a cylinder having a first end, an opposite second end, and a sidewall extending therebetween;
- a piston movably supported by the cylinder, the pump being operable to supply hydraulic fluid to the cylinder to move the piston relative to the cylinder at least from a retracted position to an advanced position; and
- a frame coupled to the sidewall of the cylinder and supporting the pump and the motor.

2. The cylinder assembly of claim 1, further comprising a valve block defining a passage selectively in fluid communication between the pump and the cylinder, the valve block being mounted on the frame, the pump being mounted to the valve block.

3. The cylinder assembly of claim 2, further comprising a reservoir configured to contain hydraulic fluid and in fluid communication with the pump, the reservoir being mounted on the valve block.

4. The cylinder assembly of claim 3, wherein the reservoir extends at least partially around the pump.

5. The cylinder assembly of claim 1, wherein the frame includes a first frame member connected to the cylinder proximate the first end thereof and a second frame member spaced from the first frame member and connected to the cylinder proximate the second end thereof.

6. The cylinder assembly of claim 5, wherein the frame further includes a handle extending between the first frame member and the second frame member.

7. The cylinder assembly of claim 6, wherein the handle is a first handle, and wherein the frame includes a second handle spaced from the first handle connected and extending between the first frame member and the second frame member.

8. The cylinder assembly of claim 5, further comprising a first rigging point connected to the first frame member and a second rigging point connected to the second frame member.

9. The cylinder assembly according to claim 1, further comprising a pressure gauge configured to measure a pressure of the hydraulic fluid.

10. The cylinder assembly according to claim 1, wherein the power source comprises a rechargeable battery pack to supply the power to the motor as DC power.

11. A pin puller assembly configured for pulling a pin from a machine, the pin puller assembly comprising the cylinder assembly of claim 1, wherein a passage extends through the cylinder, further comprising:

a pull rod positionable through the passage extending through the cylinder, the pull rod having a first end positioned proximate the first end of the cylinder and a second end positioned proximate the second end of the cylinder, the second end of the pull rod being configured to be connectable to the pin to be pulled; and a reaction member engageable between the pull rod and the piston.

12. The pin puller assembly according to claim 11, further comprising a column configured to be coupled proximate the first end of the cylinder such that the column is positioned between the cylinder and the machine when pulling the pin therefrom.

13. The pin puller assembly according to claim 12, wherein the column is a first column and is configured such that a second column is coupleable to the first column such that the second column in positioned between the first column and the machine when pulling the pin therefrom.

14. The pin puller assembly according to claim 12, further comprising a rigging point coupled to the column, the rigging point being configured for supporting at least a portion of the pin puller assembly.

15. The pin puller assembly according to claim 14, wherein the rigging point is a first rigging point, further comprising another rigging point coupled to the frame, the another rigging point being configured for supporting another portion of the pin puller assembly with the first rigging point.

16. A hydraulic jack assembly configured for lifting an external load, the hydraulic jack assembly comprising the cylinder assembly of claim 1, further comprising a base plate positioned proximate the piston, wherein the base plate is configured to be positioned to support the external load such that moving the piston relative to the cylinder lifts the external load.

17. The hydraulic jack assembly according to claim 16, wherein the frame has a first end proximate the first end of the cylinder and an opposite second end proximate the second end of the cylinder, and wherein the first end of the frame is configured to be positioned on a support surface such that operating the cylinder assembly lifts the external load vertically away from the support surface.

18. The hydraulic jack assembly according claim 16, wherein the base plate comprises a toe jack.

19. A cylinder assembly configured for use as a pin puller assembly for pulling a pin from a machine by coupling a column to the cylinder assembly, and for use as a hydraulic jack for lifting an external load without the column coupled to the cylinder assembly, the cylinder assembly comprising:

a housing;

a pump supported within the housing;

a motor supported within the housing and operable to power the pump;

a power source supported by the housing and operable to supply power to the motor;

a cylinder having a first end, an opposite second end, and a sidewall extending therebetween;

a piston movably supported by the cylinder, the pump being operable to supply hydraulic fluid to the cylinder to move the piston relative to the cylinder at least from a retracted position to an advanced position; and a frame coupled to the sidewall of the cylinder and supporting the pump and the motor;

wherein the cylinder assembly extends between a first end and an opposite second end in a first direction and between a third end and an opposite fourth end in a second direction that is perpendicular to the first direction, and wherein the cylinder assembly is configured such that the column is coupleable thereto proximate the third end of the frame such that the column is positioned between the cylinder and the machine when pulling the pin therefrom, and wherein the frame is configured such that the third end thereof is positionable on a support surface when lifting the external load.

20. The cylinder assembly according to claim 19, further comprising a rigging point coupled to the frame proximate the first end thereof, wherein the rigging point is configured such that the cylinder assembly is suspendable therefrom when operated as the pin puller assembly.

21. The cylinder assembly according to claim 19, further comprising an attachment plate configured for coupling the column to the cylinder via twist-lock, and wherein the attachment plate is also configured for coupling a base plate to the cylinder via twist-lock for use as the hydraulic jack.

* * * * *